(12) United States Patent  (10) Patent No.: US 8,613,455 B2
Berrett et al.  (45) Date of Patent: Dec. 24, 2013

(54) MOTORIZED LITTER TRANSPORT KITS, METHODS AND DEVICES RELATING THERETO

(75) Inventors: Jared Berrett, Blanding, UT (US); Kim Smith, Blanding, UT (US); Nathan Berrett, Salem, UT (US); Spencer Boyd Bradford, Blanding, UT (US)

(73) Assignee: Sage Innovation, LLC, Blanding, UT (US)

( * ) Notice: Subject to any disclaimer, the term of this patent is extended or adjusted under 35 U.S.C. 154(b) by 89 days.

(21) Appl. No.: 13/168,885

(22) Filed: Jun. 24, 2011

(65) Prior Publication Data

US 2012/0000718 A1  Jan. 5, 2012

Related U.S. Application Data

(60) Provisional application No. 61/357,990, filed on Jun. 24, 2010.

(51) Int. Cl.
*B62B 7/02* (2006.01)

(52) U.S. Cl.
USPC .............................. 280/78; 280/652; 180/21

(58) Field of Classification Search
USPC ............... 280/653, 654, 652, 78; 180/21, 13; 384/537, 544, 539, 275, 276
See application file for complete search history.

(56) References Cited

U.S. PATENT DOCUMENTS

| | | | | |
|---|---|---|---|---|
| 687,838 A * | 12/1901 | Keiper | | 16/21 |
| 2,546,604 A * | 3/1951 | Lafky | | 296/20 |
| 2,638,236 A * | 5/1953 | Prowinsky et al. | | 414/447 |
| 3,107,446 A * | 10/1963 | Messinger | | 37/434 |
| 3,222,100 A * | 12/1965 | Lindzy | | 296/20 |
| 3,690,692 A * | 9/1972 | Berkeley et al. | | 280/654 |
| 3,782,749 A * | 1/1974 | Wiczer | | 280/641 |
| 3,860,254 A * | 1/1975 | Wegener | | 280/652 |
| 3,930,663 A * | 1/1976 | Scripter | | 280/654 |
| 4,055,354 A * | 10/1977 | Sharpe | | 280/47.31 |
| 4,589,508 A * | 5/1986 | Hoover et al. | | 180/19.1 |
| 5,385,210 A * | 1/1995 | Harvey | | 180/11 |
| 5,462,369 A * | 10/1995 | Layne et al. | | 384/538 |
| 5,489,000 A * | 2/1996 | Hillbohm | | 180/19.1 |
| 5,800,023 A * | 9/1998 | Hartenstine et al. | | 301/111.07 |
| 5,806,866 A * | 9/1998 | Fleischer | | 280/47.31 |
| 5,806,878 A * | 9/1998 | Mroczka et al. | | 280/653 |
| 5,878,827 A * | 3/1999 | Fox | | 180/19.1 |
| 6,017,053 A * | 1/2000 | Leger et al. | | 280/653 |
| 6,065,555 A * | 5/2000 | Yuki et al. | | 180/19.1 |
| 6,142,492 A * | 11/2000 | DeLucia | | 280/47.331 |
| 6,173,799 B1 * | 1/2001 | Miyazaki et al. | | 180/19.3 |
| 6,443,267 B1 * | 9/2002 | Burbank et al. | | 188/2 R |
| 6,745,859 B2 * | 6/2004 | Simons et al. | | 180/19.1 |
| 6,851,701 B2 * | 2/2005 | Tomchak et al. | | 280/653 |
| 6,869,098 B2 * | 3/2005 | Tomchak et al. | | 280/653 |
| 6,926,292 B1 * | 8/2005 | Weeks | | 280/47.331 |
| 6,991,251 B2 * | 1/2006 | Tomchak et al. | | 280/653 |
| 7,017,940 B2 * | 3/2006 | Hatfull | | 280/652 |
| 7,150,465 B2 * | 12/2006 | Darling, III | | 280/640 |
| 7,172,207 B2 * | 2/2007 | Henry | | 280/651 |
| 7,461,857 B2 * | 12/2008 | Darling, III | | 280/640 |
| 7,721,835 B2 * | 5/2010 | Radtke | | 180/205.5 |
| 7,793,744 B1 * | 9/2010 | Hardie | | 180/19.1 |

(Continued)

*Primary Examiner* — Nicole Verley

(74) *Attorney, Agent, or Firm* — Stoel Rives LLP; Kelly A. Echols

(57) ABSTRACT

Disclosed are motorized litter transport kits and methods and devices relating thereto.

18 Claims, 21 Drawing Sheets

(56) References Cited

U.S. PATENT DOCUMENTS

| | | |
|---|---|---|
| 7,866,686 B2 * | 1/2011 | Conaway et al. .............. 280/653 |
| 7,976,049 B2 * | 7/2011 | Chiu ........................... 280/304.1 |
| 8,272,469 B2 * | 9/2012 | Stoehr et al. ................... 180/337 |
| 8,366,125 B2 * | 2/2013 | Loomans .................... 280/47.17 |
| 2004/0084864 A1 * | 5/2004 | Casey et al. ................. 280/47.31 |
| 2004/0108688 A1 * | 6/2004 | Holmes ......................... 280/640 |
| 2004/0135333 A1 * | 7/2004 | Feick .......................... 280/47.31 |
| 2008/0197608 A1 * | 8/2008 | Dixon ........................... 280/654 |
| 2011/0272924 A1 * | 11/2011 | Kilen ........................... 280/653 |

* cited by examiner

MOTORIZED LITTER TRANSPORT KITS, METHODS AND DEVICES RELATING THERETO

CROSS-REFERENCE TO RELATED APPLICATIONS

This application, under 35 U.S.C. §119(e), claims the benefit of U.S. provisional application Ser. No. 61/357,990, filed Jun. 24, 2010, which is hereby incorporated by reference in its entirety.

FIELD OF THE INVENTION

The invention relates generally to search and rescue litter transport, and in particular, to motorized litter transport kits and methods and devices relating thereto.

BACKGROUND OF THE INVENTION

Rescuing injured persons from remote wilderness areas or any area where motorized vehicles or helicopters have limited access is very difficult. Often, search and rescue teams have to carry an injured person to safety. Therefore, search and rescue teams often have to utilize numerous individuals to allow for the rotation of fatigued team members during such rescue efforts. Such efforts are time consuming and expensive.

A need exists in the art for a way of transporting an injured person on a litter than can reduce the number of search and rescue team members required to bring an injured person to safety.

BRIEF SUMMARY OF THE INVENTION

The invention provides an assembable and disassemblable motorized litter transport kits. The kits comprises a single wheel, an axle assembly configured to be securely and detachably engaged with the single wheel, a motorized drive train configured to be able to drive said single wheel via the axle assembly, frame members configured to be able to support the single wheel and the motorized drive train; and clamp members configured to be operably connected to the frame members and configured to releasably secure a litter to the frame members.

The invention also provides methods of assembling the kits.

The invention also provides a clamp comprising a hook, a knob comprising a threaded member designed to be received by the hook, a hollow shank with a first end and a second end, a sleeve configured to sit within the second end of the hollow shank, configured to receive said knob, and further configured to rotationally support the knob, a spacer configured to allow the threaded member of the knob to pass through the radial center of the spacer and wherein the spacer is configured to separate a clamp seat from the first end of the hollow shank. The hook is configured to mate with the inner surfaces of the clamp seat such that rotation of the clamp seat rotates the hook. The clamp seat is configured such that the pulling of the hook towards the knob via rotation of the threaded member of the knob results in the clamp seat being pulled with the hook.

The invention also provides a bearing assembly for use with two arms situated next to each other and intended to be parallelally rotatable about the same axle. The bearing assembly comprises a first cylindrical hub attached to one arm and a second cylindrical hub attached to a second arm, wherein the first cylindrical hub is oriented next to and inline with the second cylindrical hub. The bearing assembly also comprises a bearing sleeve configured to slide within an inner surface of the first cylindrical hub and the second cylindrical hub, wherein the bearing sleeve includes a shoulder that overlaps with a bottom surface of the second cylindrical hub and wherein the bearing sleeve extends beyond the top surface of the first cylindrical hub and wherein the bearing sleeve includes an annular groove in the outer surface of the bearing sleeve proximate the top surface of the first cylindrical hub, wherein the annular groove is configured to receive a spring clip. The bearing assembly further comprises the spring clip. Additionally, when the spring clip is in place, the cylindrical hub is sandwiched between the spring clip and the shoulder of the bearing sleeve.

Unless otherwise defined, all technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

Other features and advantages of the invention will be apparent from the following detailed description, and from the claims.

BRIEF DESCRIPTION OF THE DRAWINGS

While the specification concludes with claims particularly pointing out and distinctly claiming that which is regarded as the present invention, specific embodiments of this invention can be more readily ascertained from the following description of the invention when read in conjunction with the accompanying drawings in which:

DETAILED DESCRIPTION OF THE INVENTION

As noted previously, the invention relates generally to search and rescue litter transport, and in particular, to motorized litter transport kits and methods and devices relating thereto.

Figure 1:
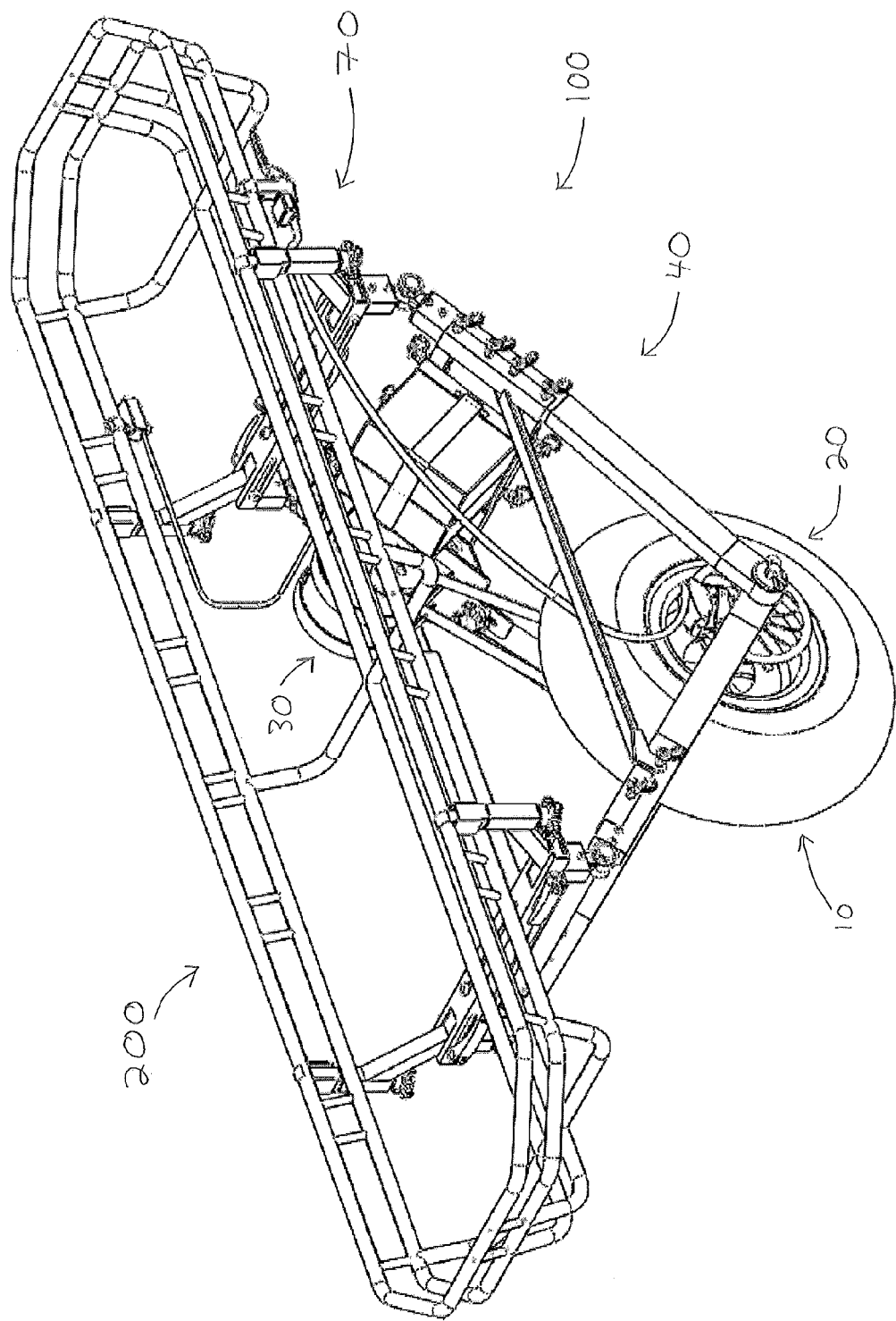
FIG. 1 illustrates one embodiment of an assembled motorized litter transport kit with an embodiment of a litter clamped thereto.

FIG. 1 illustrates one embodiment of an assembled motorized litter transport kit 100 (hereinafter "kit 100") with an embodiment of a litter 200 clamped thereto. Kit 100 comprises single wheel 10, axle assembly 20 configured to be securely and detachably engaged with single wheel 10, motorized drive train 30 configured to be able to drive single wheel 10 via axle assembly 20, frame members 40 are configured to be able to support single wheel 10 and motorized drive train 30; and clamp members 70 are configured to be operably connected to frame members 40 and configured to releasably secure litter 200 to frame members 40.

Kit 100 is designed to allow different parts of kit 100 to be transported by different individuals if desired and then assembled when needed, such as in a remote location not easily accessible by helicopter or vehicle.

FIGS. 2-12 illustrate assembly of kit 100 and particular parts of kit 100.

Figure 2:
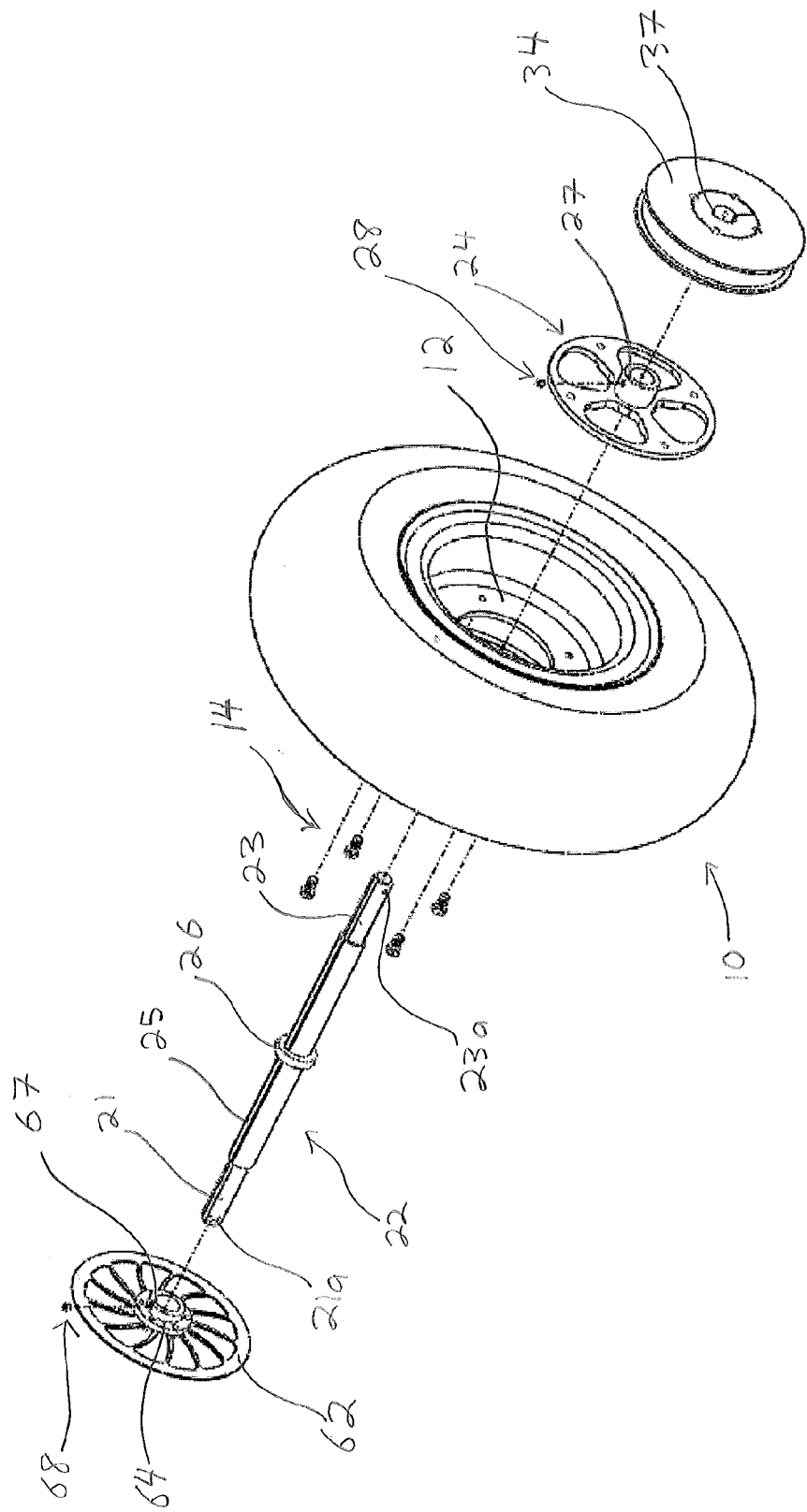
FIG. 2 illustrates assembly of one embodiment of a single wheel and one embodiment of an axle assembly.

FIG. 2 illustrates assembly of single wheel 10 and axle assembly 20. Axle assembly 20 comprises axle 22 configured to be operably connected to single wheel 10. In the illustrated embodiments, axle 22 is a cylindrical member configured to extend through the radial center of single wheel 10 and is also configured to protrude on either side of single wheel 10.

Axle assembly 20 further comprises wheel hub member 24 configured to be securely and detachably attached to axle 22 and also configured to be securely and detachably attached to rim 12 of single wheel 10. Wheel hub member 24 may be attached to rim 12 with screws 14, such as illustrated in FIG. 2. Axle 22 may also include wheel hub stop 26 located halfway along the length of axle 22 for determining the extent to which axle 22 protrudes on either side of single wheel 10. If present, wheel stop 26 may rest against the back surface of wheel hub member 24 (viewed from the perspective of FIG. 2).

In FIG. 2, axle 22 comprises recessed bearing races 21 and 23. Recessed bearing races 21 and 23 have a reduced diameter compared to the rest of axle 22. Proximate the end of bearing race 21 is pinhole 21a. Proximate the end of bearing race 23 is pinhole 23a. The function of pinholes 21a and 23a will be discussed further below. Axle 22 further comprises a key 25 that protrudes from the surface of axle 22 and runs the length of axle 22 between bearing races 21 and 23. Wheel hub member 24 has a keyway 27 designed to mate with key 25 of axle 22. Axle 22 is designed to slide through the center of wheel hub member 24. Wheel hub member 24 is rotational locked in place with axle 22 via the interaction of key 25 with keyway 27. Wheel hub member 24 is further attached to axle 22 via set screw 28.

For convenience, when packing unassembled kit 100 for transportation (such as search and rescue team members loading parts of kit 100 into various back packs), wheel hub member 24 may be attached to rim 12 prior to packing the parts to save time in assembling kit 100 later (such as after an injured person has been located).

Motorized drive train 30 comprises drive hub member 34 configured to be securely and detachably attached to axle 22. Drive hub member 34 is designed to slide over axle 22. Drive hub member 34 has a keyway 37 designed to mate with key 25 of axle 22. Drive hub member 34 is rotational locked in place with axle 22 via the interaction of key 25 with keyway 37. In one embodiment, drive hub member 34 is a commercially-available Gates® Poly Chain® drive sprocket.

Kit 100 further comprises brake assembly 60 configured to be operably connected with axle 22. Brake assembly 60 comprises disc brake rotor 62 configured to be securely and detachably attached to axle 22. Brake assembly 60 further comprises disc brake hub member 64 configured to be positionably, securely, and detachably attached to axle 22. Disc brake hub member 64 is also configured to be securely and detachably attached to disc brake rotor 62. Disc brake hub member 64 may be screwed together with disc brake rotor 62, as illustrated in FIG. 2.

For convenience, when packing unassembled kit 100 for transportation, disc brake hub member 64 may be attached to disc brake rotor 62 prior to packing the parts to save time in assembling kit 100 later.

Disc brake hub member 64 and disc brake rotor 62 are designed to slide over axle 22. Disc brake hub member 64 has a keyway 67 designed to mate with key 25 of axle 22. Disc brake rotor 62 also has a keyway 69 (illustrated in FIG. 3) designed to mate with key 25 of axle 22. Disc brake hub member 64 and disc brake rotor 62 are each rotational locked in place with axle 22 via the interaction of key 25 with keyway 67 and keyway 69, respectively. Disc brake hub member 64 is further attached to axle 22 via set screw 68.

Figure 3:
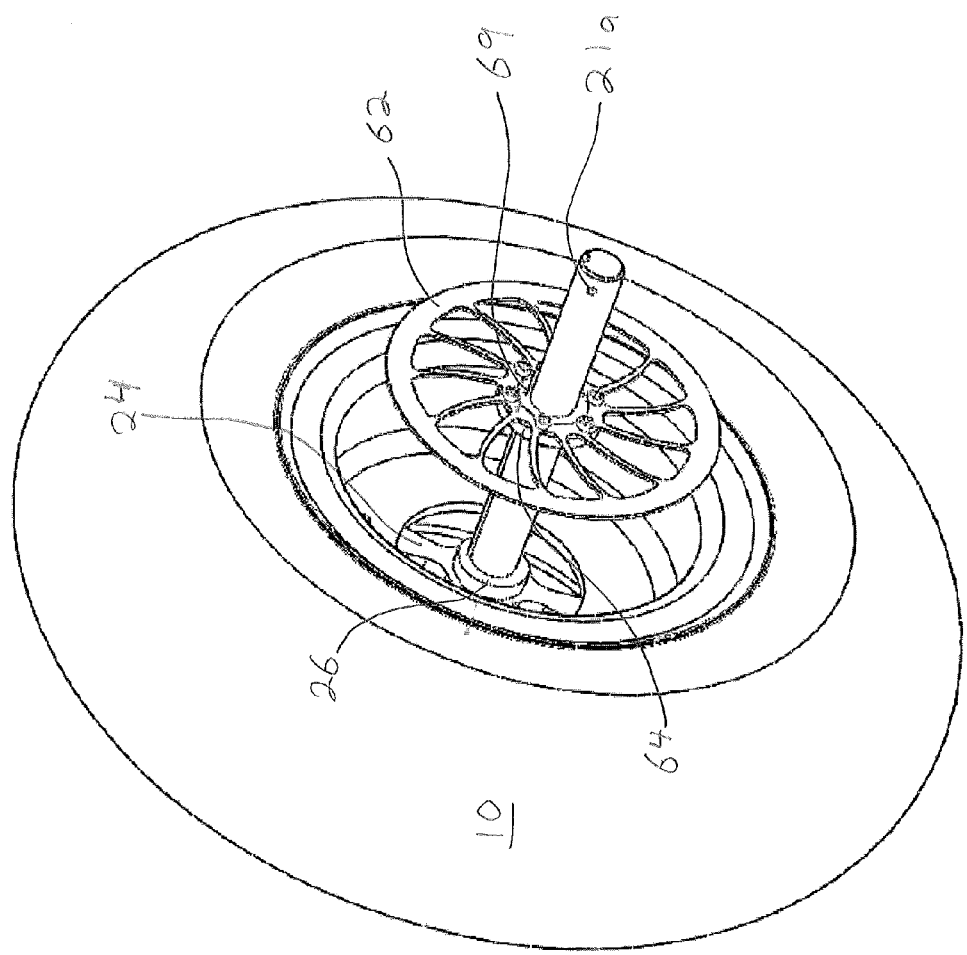
FIG. 3 illustrates one embodiment of a single wheel, one embodiment of an axle assembly, one embodiment of particular brake assembly components.

FIG. 3 illustrates single wheel 10, axle assembly 20, disc brake hub member 64, and disc brake rotor 62 after assembly.

Figure 4:
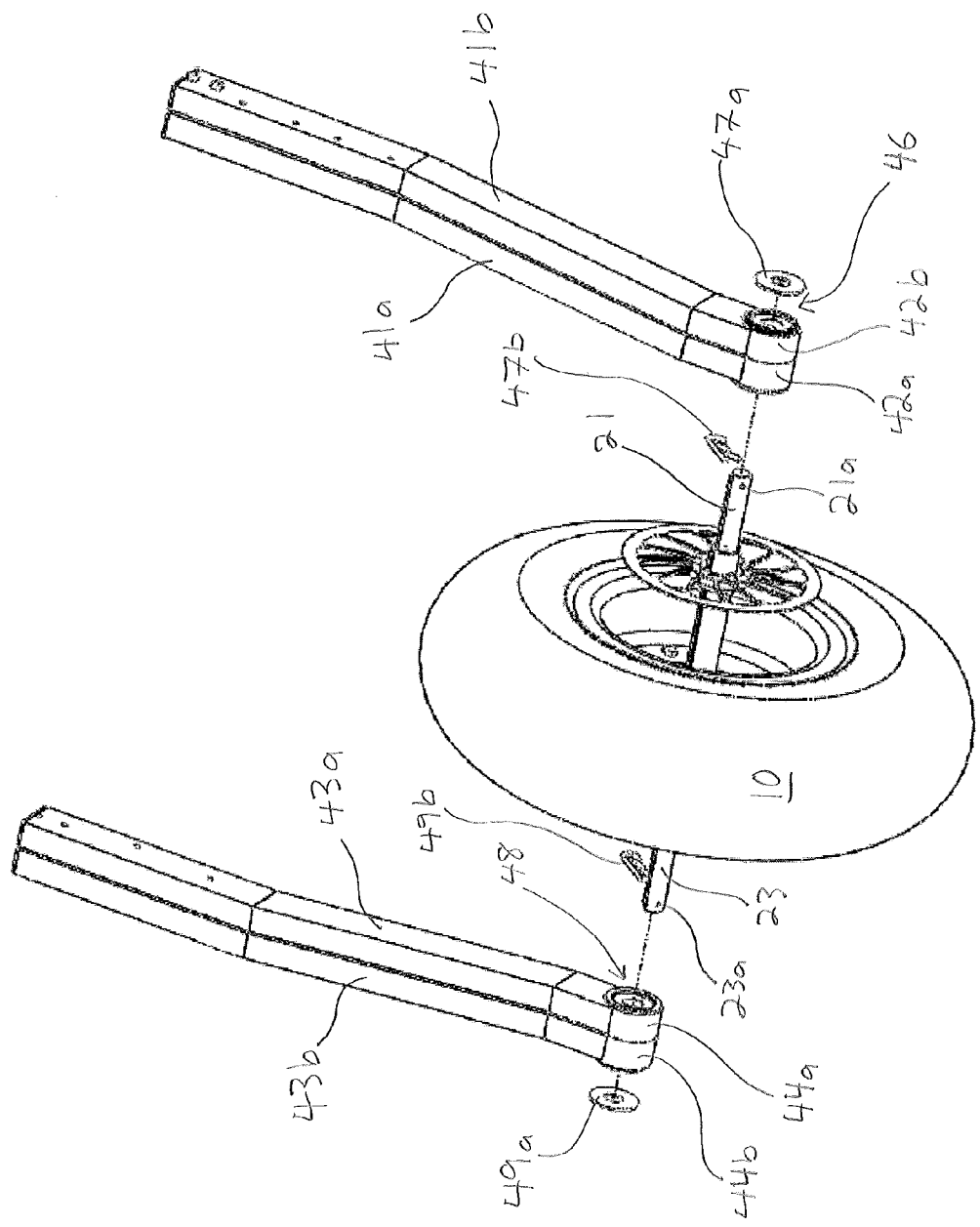
FIG. 4 illustrates the beginning of assembly of one embodiment of particular frame members with one embodiment of an axle assembly and one embodiment of a single wheel.

FIG. 4 illustrates the beginning of assembly of frame members 40 with axle assembly 20 and single wheel 10. Frame members 40 comprise frame arm member 41a, frame arm member 41b, frame arm member 43a, and frame arm member 43b. A first end of each of frame arm member 41a, frame arm member 41b, frame arm member 43a, and frame arm member 43b includes a bearing assembly configured to be rotatably, securely, and operably connected with an axle of said axle assembly.

Frame arm member 41a and frame arm member 41b are configured to be rotatably engaged with bearing race 21 of axle 22. Frame arm member 41a and frame arm member 41b are also configured to rotate parallel to each other upon engagement with bearing race 21. Frame arm member 42a and frame arm member 42b are configured to be rotatably engaged with bearing race 23 of axle 22. Frame arm member 42a and frame arm member 42b are also configured to rotate parallel to each other upon engagement with bearing race 23.

Frame arm member 41a and frame arm member 41b each include arm bearing mount hub 42a and 42b, respectively. Bearing mount hub 42a and 42b are designed to together receive bearing assembly 46. Arm bearing assembly 46 is designed to engage bearing race 21 of axle 22. Washer 47a and hairpin cotter pin 47b secure frame arm member 41a and frame arm member 41b to bearing race 21.

Frame arm member 43a and frame arm member 43b each include arm bearing mount hub 44a and 44b, respectively. Arm bearing mount hub 44a and 44b are designed to together receive bearing assembly 48. Bearing assembly 48 is designed to engage bearing race 23 of axle 22. Washer 49a and hairpin cotter pin 49b secure frame arm member 43a and frame arm member 43b to bearing race 23.

Figure 5C:
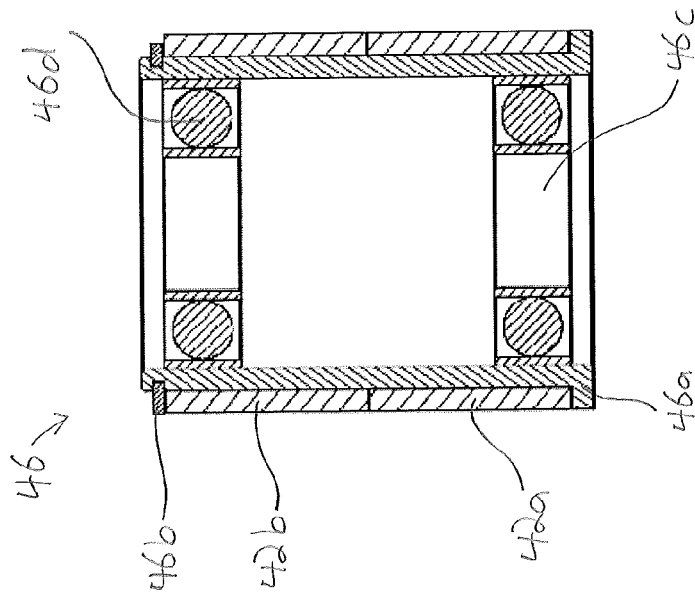
FIGS. 5A-5C illustrate a close-up of one embodiment of a bearing assembly and one embodiment of frame member structure using such a bearing assembly.
Figure 5B:
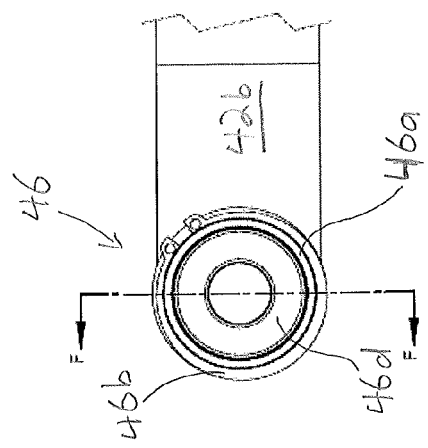
Figure 5A:
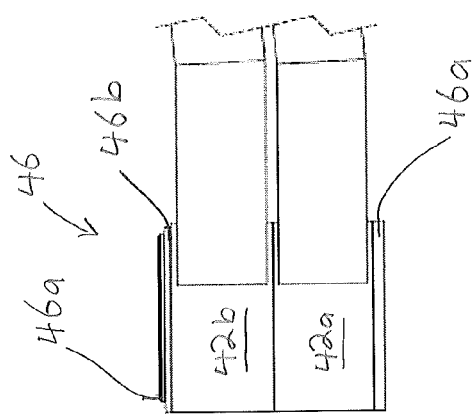

FIGS. 5A-5C illustrate a close-up of bearing assembly 46 and arm bearing mount hub 42a and 42b. It should be understood that similar structures are found within bearing assembly 48 as within bearing assembly 46. FIG. 5A illustrates a side view of arm bearing mount hub 42a and 42b and bearing assembly 46. FIG. 5B illustrates a top view of arm bearing mount hub 42a and bearing assembly 46. FIG. 5C illustrates a cross-sectional slice along the line F-F of FIG. 5B.

Bearing assembly 46 comprises a bearing sleeve 46a. Bearing assembly 46 further comprises a spring clip 46b. Bearing sleeve 46a is configured slide within an inner surface of arm bearing mount hub 42a and 42b. Bearing sleeve 46a includes a shoulder that overlaps with a bottom surface of arm bearing mount hub 42a (relative to FIG. 5B illustrating a "top" view of arm bearing mount 42b), as illustrated in FIGS. 5A and 5C. Bearing sleeve 46a extends through arm bearing mount hub 42b. Proximate the top surface of arm bearing mount hub 42b, the outer surface of bearing sleeve 46a includes an annular groove. The annular groove is configured to receive a spring clip 46b. When spring clip 46b is in place, arm bearing mount hub 42a and 42b are sandwiched between spring clip 46b and the shoulder of bearing sleeve 46a.

Bearing assembly 46 further comprises bearings 46c and 46d. Bearings 46c and 46d sit within bearing sleeve 46a, as illustrated in FIGS. 5B and 5C. The inner surface of bearing 46c and 46d is configured to engage bearing race 21 of axle 22.

For convenience, when packing unassembled kit 100 for transportation, bearing assembly 46 may be attached to arm bearing mount hub 42a and 42b and bearing assembly 48 may be attached to arm bearing mount hub 44a and 44b prior to packing the parts, to save time in assembling kit 100 later. This gives the additional benefit that frame arm member 41a and 41b may be packed together in a concise manner and likewise for frame arm member 43a and 43b.

Figure 6:
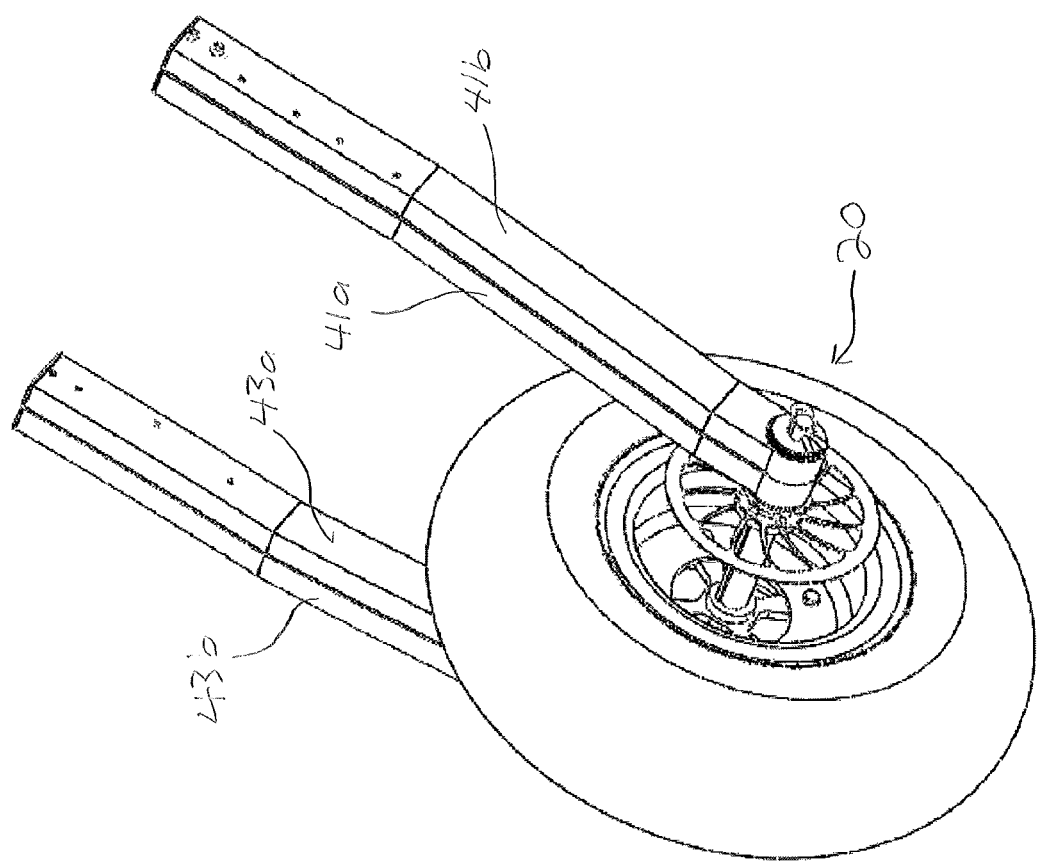
FIG. 6 illustrates one embodiment of particular frame members after assembly with one embodiment of an axle assembly.

FIG. 6 illustrates frame arm member 41a and 41b and frame arm member 43a and 43b after assembly with axle assembly 20.

Figure 7:
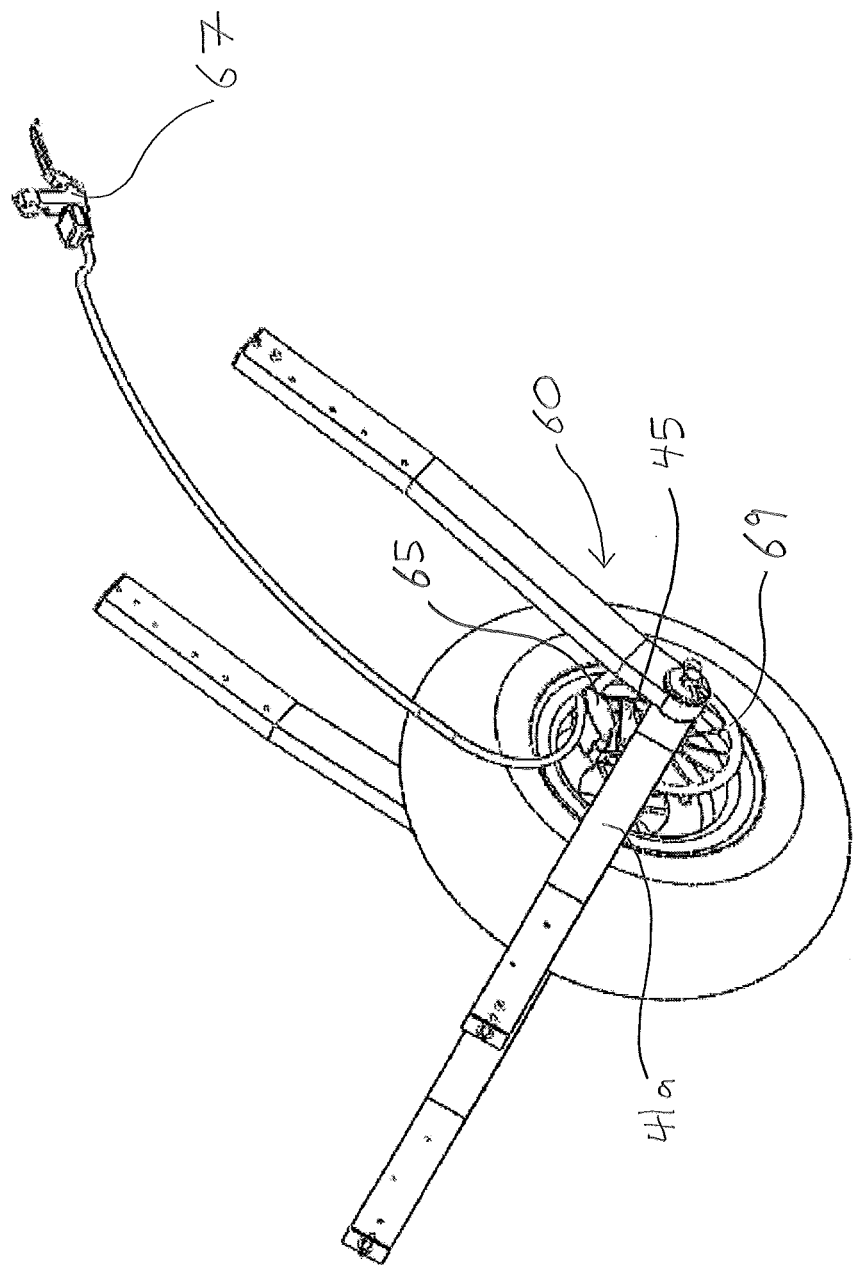
FIG. 7 illustrates further assembly of one embodiment of a brake assembly.

FIG. 7 illustrates frame arm member 41a and 41b after parallel rotation in preparation for the next assembly steps and likewise for frame arm member 43a and 43b. FIG. 7 also illustrates further assembly of brake assembly 60. Frame arm member 41a further comprises a brake mount 45. Brake assembly 60 is configured to be operably connected with brake mount 45. Brake assembly 60 further comprises caliper 65 configured to be securely and detachably attached to brake mount 45. Caliper 65 is also configured to operably interact with disc brake rotor 69 upon assembly. Actuator 67 for caliper 65 is configured for positionable attachment to litter 200 upon completion of assembly of kit 100.

Figure 8:
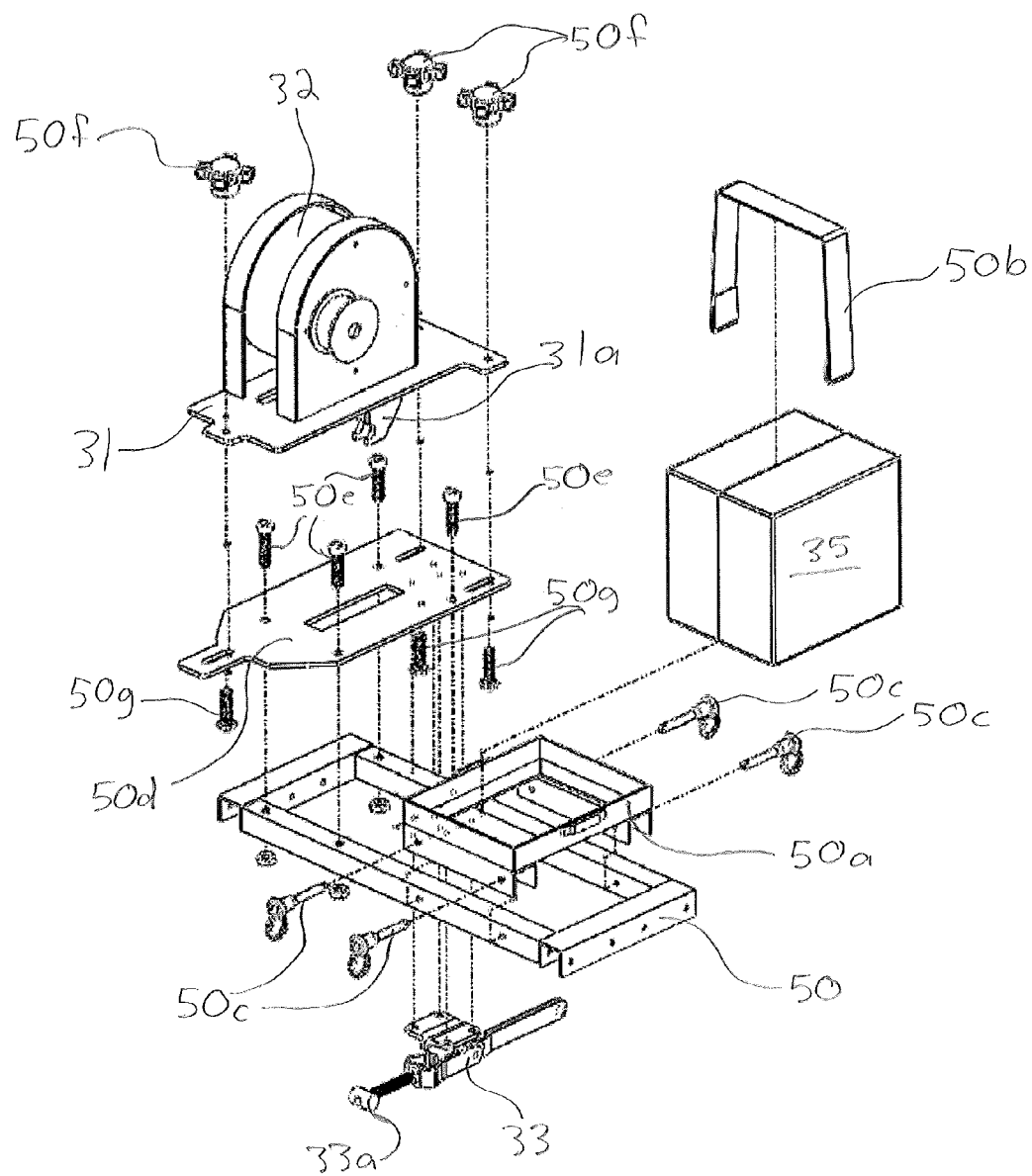
FIG. 8 illustrates further assembly of one embodiment of a motorized drive train 30 and one embodiment of particular frame members.

FIG. 8 illustrates further assembly of motorized drive train 30 and frame members 40. Frame members 40 further comprise component base frame member 50 configured to be able to support motor 32 of motorized drive train 30. Component base frame member 50 is further configured to be able to adjustably support motor 32. Motorized drive train 30 further comprises a throttle control member 38 configured for positionable attachment to litter 200.

Component base frame member 50 includes motor mount 50d designed to further support motor 32 and attached to component base frame member 50 via screws 50e. Motorized drive train 30 also comprises latch plate 31 and tensioner 33. Latch plate 31 is designed to slide on motor mount 50d in order to tension belt 36 (shown in FIG. 9). Latch plate 31 includes a hook 31a. Tensioner 33 is a commercially-available pull-action toggle clamp with a machine screw and barrel nut 33a attached. Tensioner 33 is attached to the underside of motor mount 50d. Machine screw and barrel nut 33a are designed to mate with hook 31a while tensioner 33 is in a slack position. Tensioner 33 is pulled to slide latch plate 31 until belt 36 is appropriately tensioned. Adjustment knobs 50f are then tightened against screws 50g to secure motor 32 and belt 36 under the appropriate tension.

For convenience, when packing unassembled kit 100 for transportation, motor mount 50d may be attached to component base frame member 50 and tensioner 33 attached to motor mount 50d prior to packing the parts to save time in assembling kit 100 later.

Component base frame member 50 is further configured to be able to support energy source 35 for motor 32. Component base frame member 50 includes tray 50a designed to support energy source 35, pins 50b designed to easily secure and unsecure tray 50a, and clasp 50b designed to further secure energy source 35.

Figure 9:
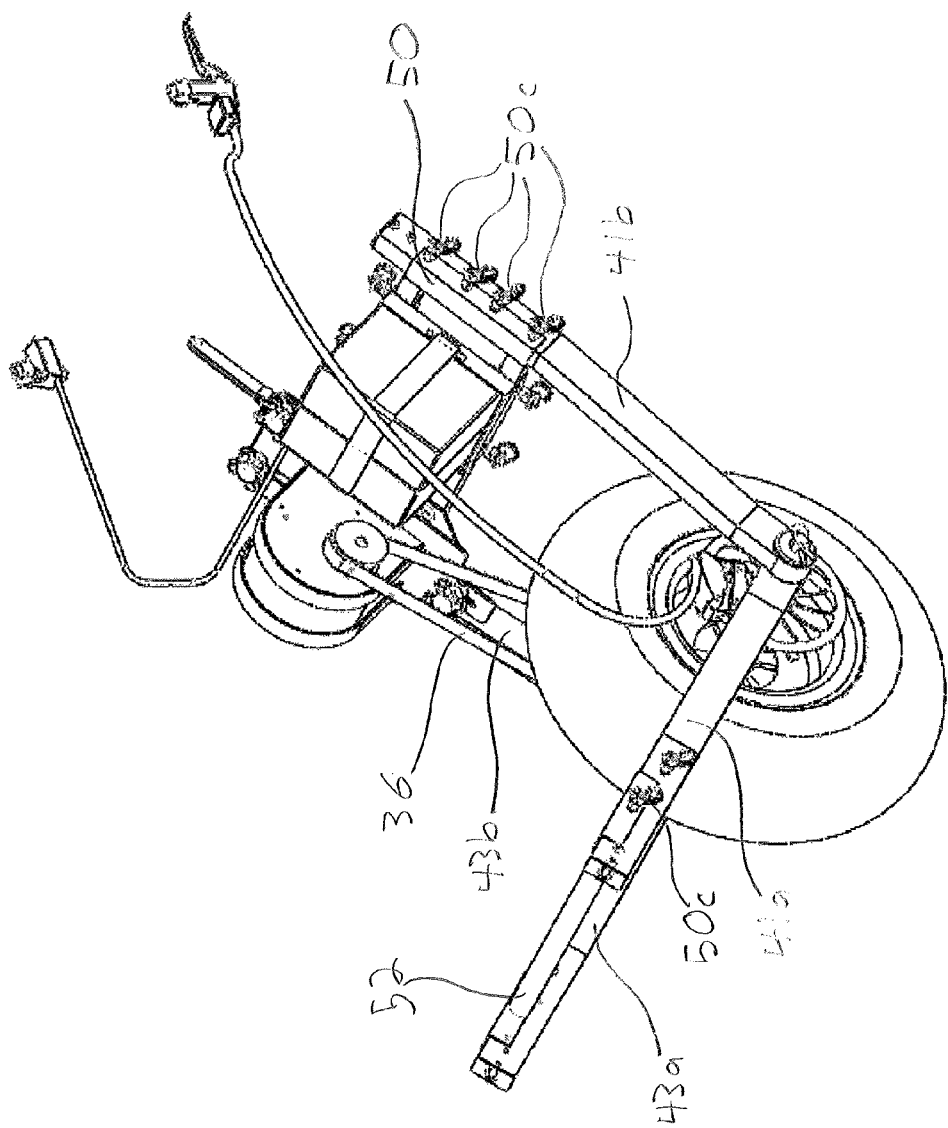
FIGS. 9 and 10 illustrate further assemble of one embodiment of particular frame members.
Figure 10:
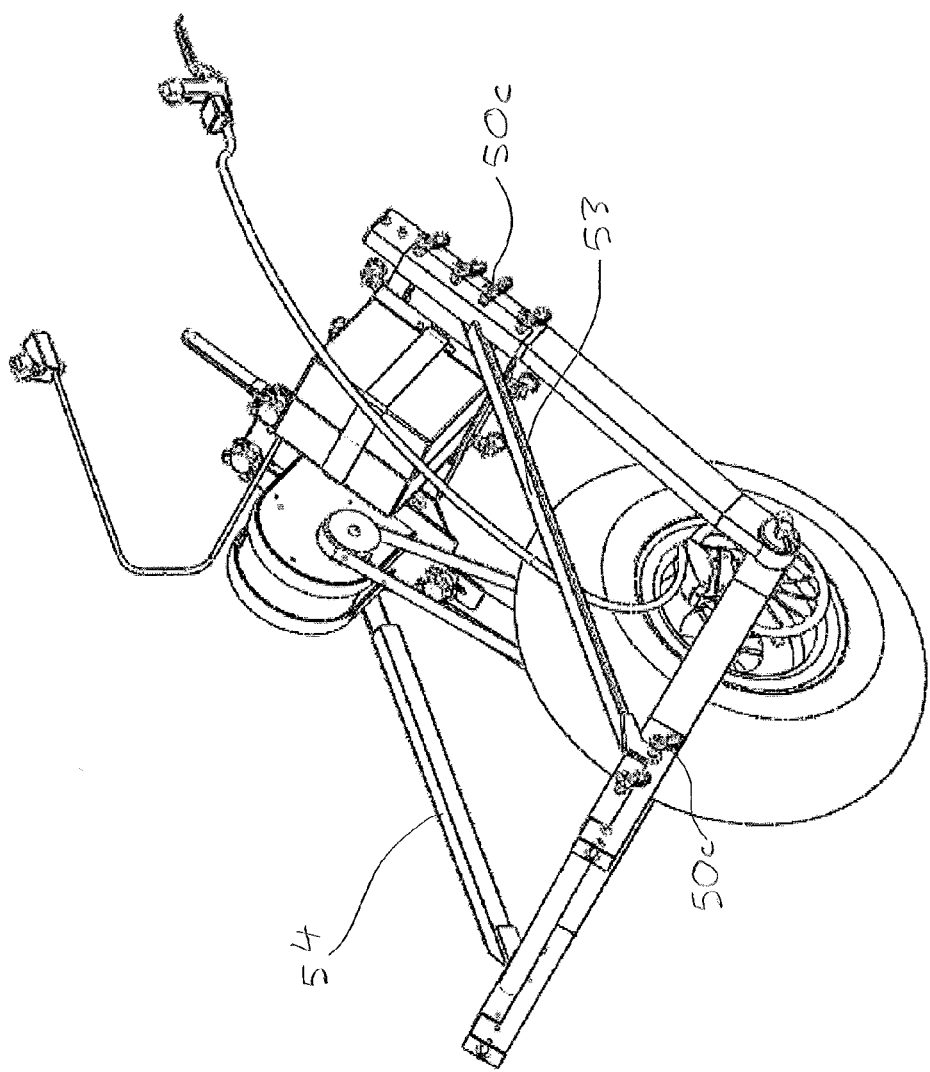

FIGS. 9 and 10 illustrate further assemble of frame members 40. Component base frame member 50 is also configured to be able to rigidly and symmetrically align frame arm member 41b with frame arm member 43b on opposing sides of single wheel 10. Component base frame member 50 is attached to frame arm member 41b and 43b via pins 50c.

Frame members 40 further comprise cross brace member 52 configured to be able to rigidly and symmetrically align frame arm member 41a with said frame arm member 43a on opposing sides of single wheel 10. Cross brace member 52 is attached to frame arm member 41a and 43a via pins 50c.

Frame members 40 comprise side brace member 53 configured to be able to rigidly position frame arm member 41a relative to frame arm member 41b. Frame members 40 further comprise side brace member 54 configured to be able to rigidly position frame arm member 43a relative to frame arm member 43b. Side brace member 53 is attached to frame arm member 41a and 41b via pins 50c, which may be the same pins 50c used to attach cross brace member 52 and/or component base member 50 thereto. Side brace member 54 is attached to frame arm member 43a and 43b via pins 50c (not shown), which may be the same pins 50c used to attach cross brace member 52 and/or component base member 50 thereto.

Figure 11:
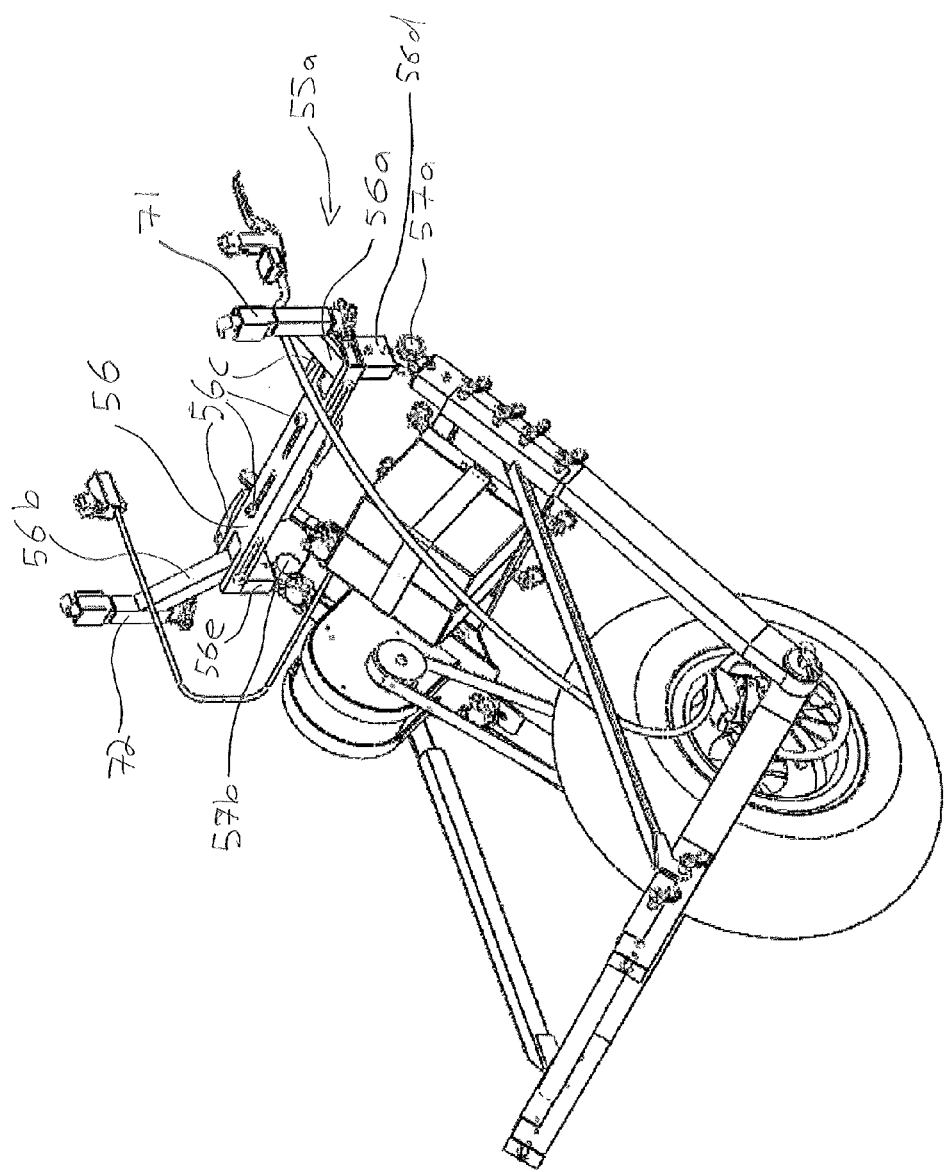
FIG. 11 illustrates assembly of one embodiment of a clamp mount assembly and one embodiment of clamp members.

FIG. 11 illustrates further assembly of frame members 40. Frame members 40 further comprise clamp mount assembly 55a configured to be able to adjustably secure clamp member 71a selected distance from clamp member 72.

Clamp mount assembly 55a comprises cross support member 56, clamp positioning member 56a mounted to clamp member 71 and configured to be able to slidably engage a proximate end (from the perspective of FIG. 11) of cross support member 56, clamp positioning member 56b mounted to clamp member 72 and configured to be able to slidably engage a distal end of cross support member 56, wherein clamp positioning member 56a and clamp positioning member 56b are each configured to be able to adjust the selected distance of clamp member 71 from clamp member 72.

Clamp mount assembly 55a further comprises connecting member 57a configured to be able to rigidly secure an upper end (from the perspective of FIG. 11) of frame arm member 41b to cross support member 56 and wherein clamp mount assembly 55a further comprises connecting member 57b configured to be able to rigidly secure an upper end of frame arm member 43b to cross support member 56.

Cross support member 56 comprises a rectangular tube. Clamp positioning member 56a and 56b are designed to slide in and out of cross support member 56. Cross support member 56 includes slots that can overlap with holes in clamp positioning member 56a and 56b. Clamp 56c is inserted through the slots and holes to secure clamp positioning member 56a and 56b at the desired position. Clamp 56c is a bicycle-type quick release clamp.

Cross support member 56 also comprises tube stubs 56d and 56e on the underside (from the perspective of FIG. 11) of the cross support member 56. Tube stub 56d is proximate the proximal end of the horizontal rectangular tube of cross support member 56. Tube stub 56e is proximate the distal end of the horizontal rectangular tube of cross support member 56. Connecting member 57a and 57b is a commercially-available adjustable locking hinge. In other embodiments, connecting member 57a and 57b is not an adjustable hinge, but is fixed at a particular angle, such as with welded tubing. Connecting member 57a connects tube stub 56d with the upper end of frame arm member 41b. Connecting member 57b connects tube stub 56e with the upper end of frame arm member 43b. Sleeves (not shown) may facilitate connection of connecting member 57a and 57b with frame arm member 41b and 43b, respectively.

Figure 12:
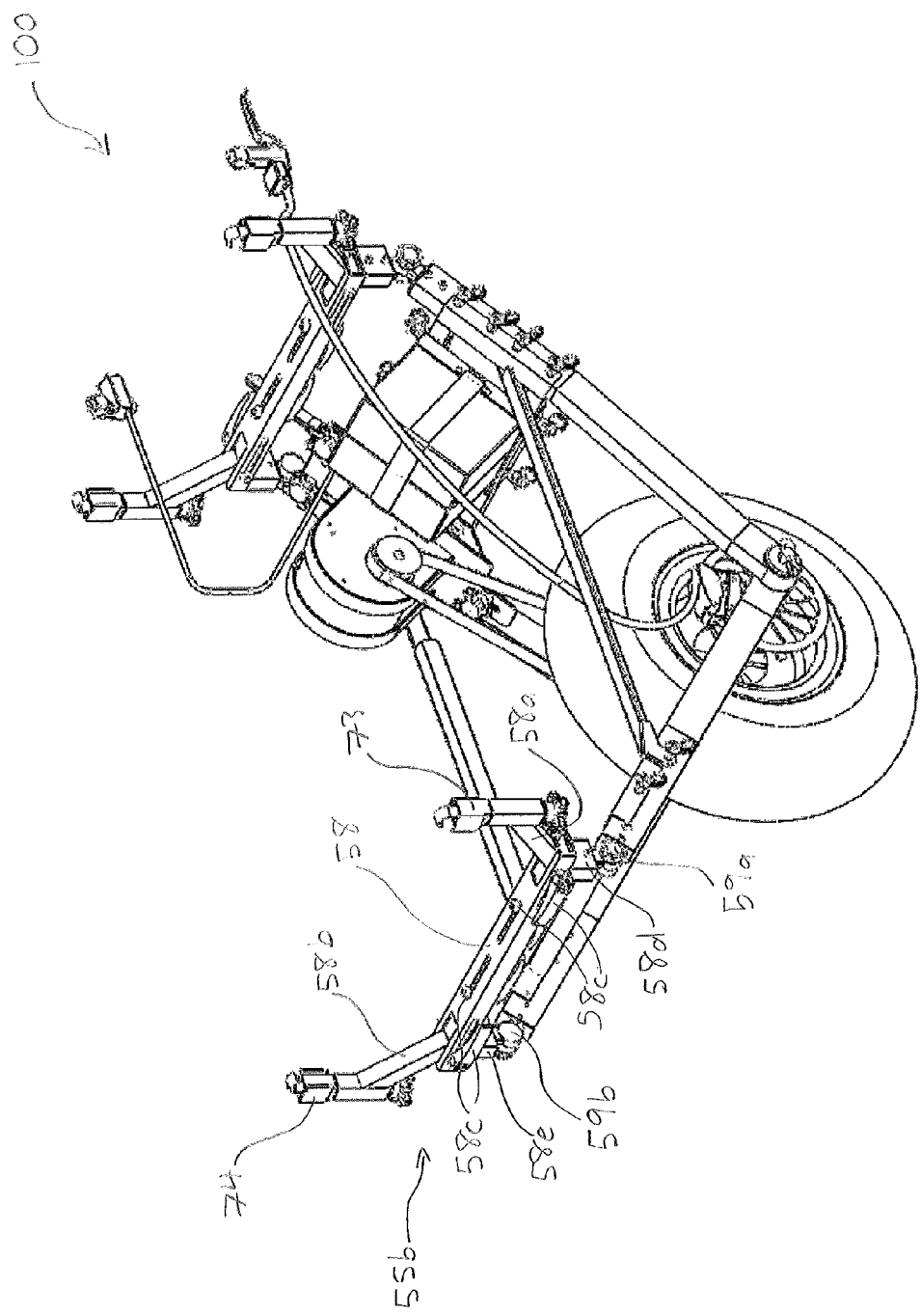
FIG. 12 illustrates assembly of one embodiment of an additional clamp mount assembly and one embodiment of clamp members.

FIG. 12 illustrates final assembly of frame members 40. Frame members 40 further comprise clamp mount assembly 55b configured to be able to adjustably secure clamp member 73 a selected distance from clamp member 74.

Clamp mount assembly 55b comprises cross support member 58, clamp positioning member 58a mounted to clamp member 73 and configured to be able to slidably engage a proximate end (from the perspective of FIG. 12) of cross support member 58, clamp positioning member 58b mounted to clamp member 74 and configured to be able to slidably engage a distal end of cross support member 58, wherein clamp positioning member 58a and clamp positioning member 58b are each configured to be able to adjust the selected distance of clamp member 73 from clamp member 74.

Clamp mount assembly 55b further comprises connecting member 59a configured to be able to rigidly secure an upper end (from the perspective of FIG. 12) of frame arm member 41a to cross support member 58 and wherein clamp mount assembly 55b further comprises connecting member 59b configured to be able to rigidly secure an upper end of frame arm member 43a to cross support member 58.

Cross support member 58 comprises a rectangular tube. Clamp positioning member 58a and 58b are designed to slide in and out of cross support member 58. Cross support member 58 includes slots that can overlap with holes in clamp positioning member 58a and 58b. Clamp 58c is inserted through the slots and holes to secure clamp positioning member 58a and 58b at the desired position. Clamp 58c is a bicycle-type quick release clamp.

Cross support member 58 also comprises tube stubs 58d and 58e on the underside (from the perspective of FIG. 12) of the cross support member 58. Tube stub 58d is proximate the proximal end of the horizontal rectangular tube of cross support member 58. Tube stub 58e is proximate the distal end of the horizontal rectangular tube of cross support member 58. Connecting member 58a and 58b is a commercially-available adjustable locking hinge. Connecting member 59a connects tube stub 58d with the upper end of frame arm member 41a. Connecting member 59b connects tube stub 58e with the upper end of frame arm member 43a. Sleeves (not shown) may facilitate connection of connecting member 59a and 59b with frame arm member 41a and 43a, respectively.

Figure 13:
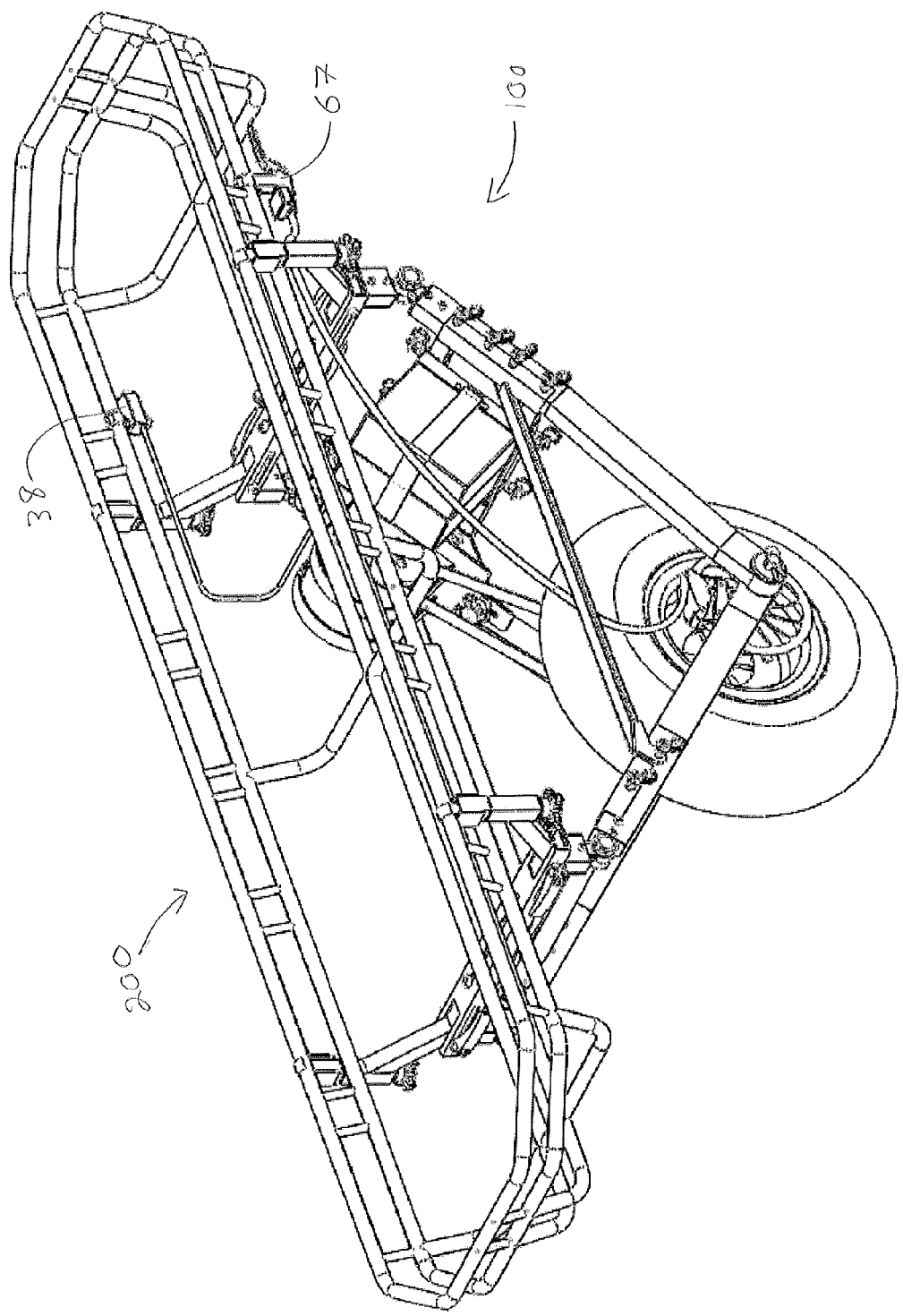
FIG. 13 illustrates attachment of one embodiment of a litter to one embodiment of a fully assembled kit 1 and attachment of one embodiment of an actuator and one embodiment of a throttle control member to the litter.
Figure 14:
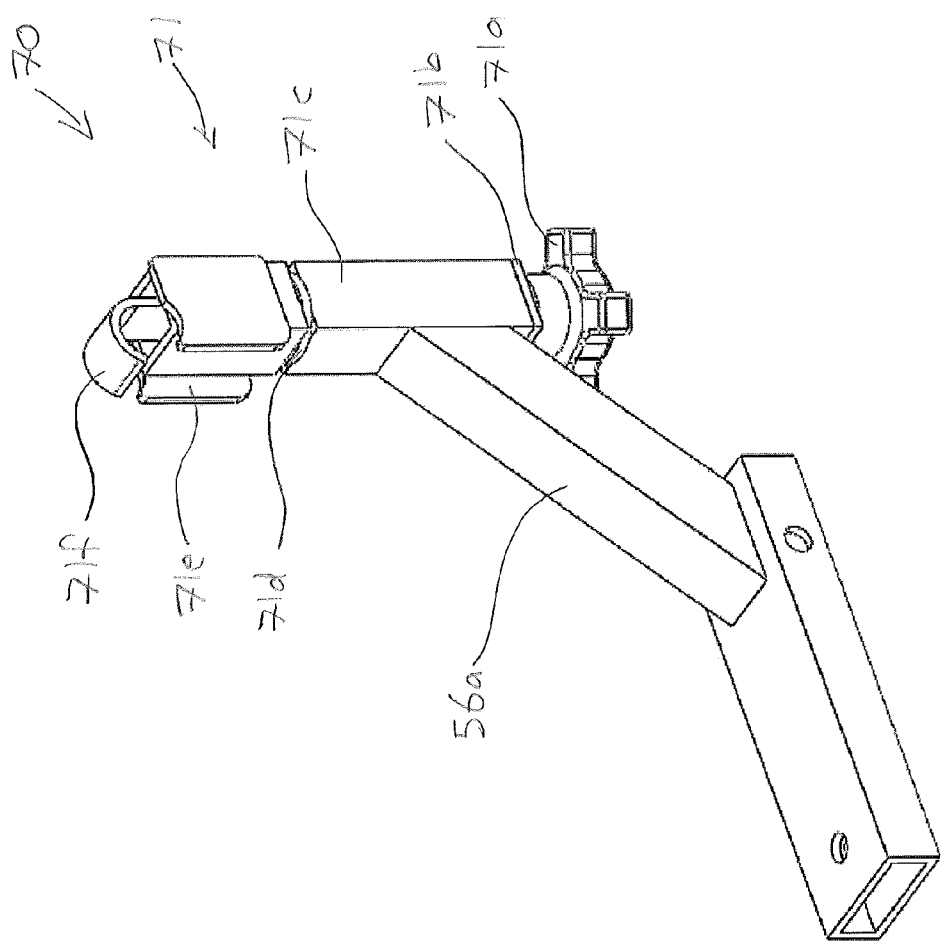
FIGS. 14-19 illustrate different views and particular embodiments of clamp members.

FIG. 13 illustrates attachment of litter 200 to fully assembled kit 100 and attachment of actuator 67 and throttle control member 38 to litter 200. It should be understood that actuator 67 and throttle control member 38 may be positioned for an operator's convenience.

FIGS. 14-19 illustrate different views and particular embodiments of clamp members 70. Clamp member 71 and clamp positioning member 56a are particularly discussed. It should be understood that the discussion regarding clamp member 71 is also applicable to clamp member 72, 73, and 74. Clamp member 71 includes a knob 71a, sleeve 71b, hollow shank 71c, a spacer 71d, clamp seat 71e, and hook 71f.

Figure 15:
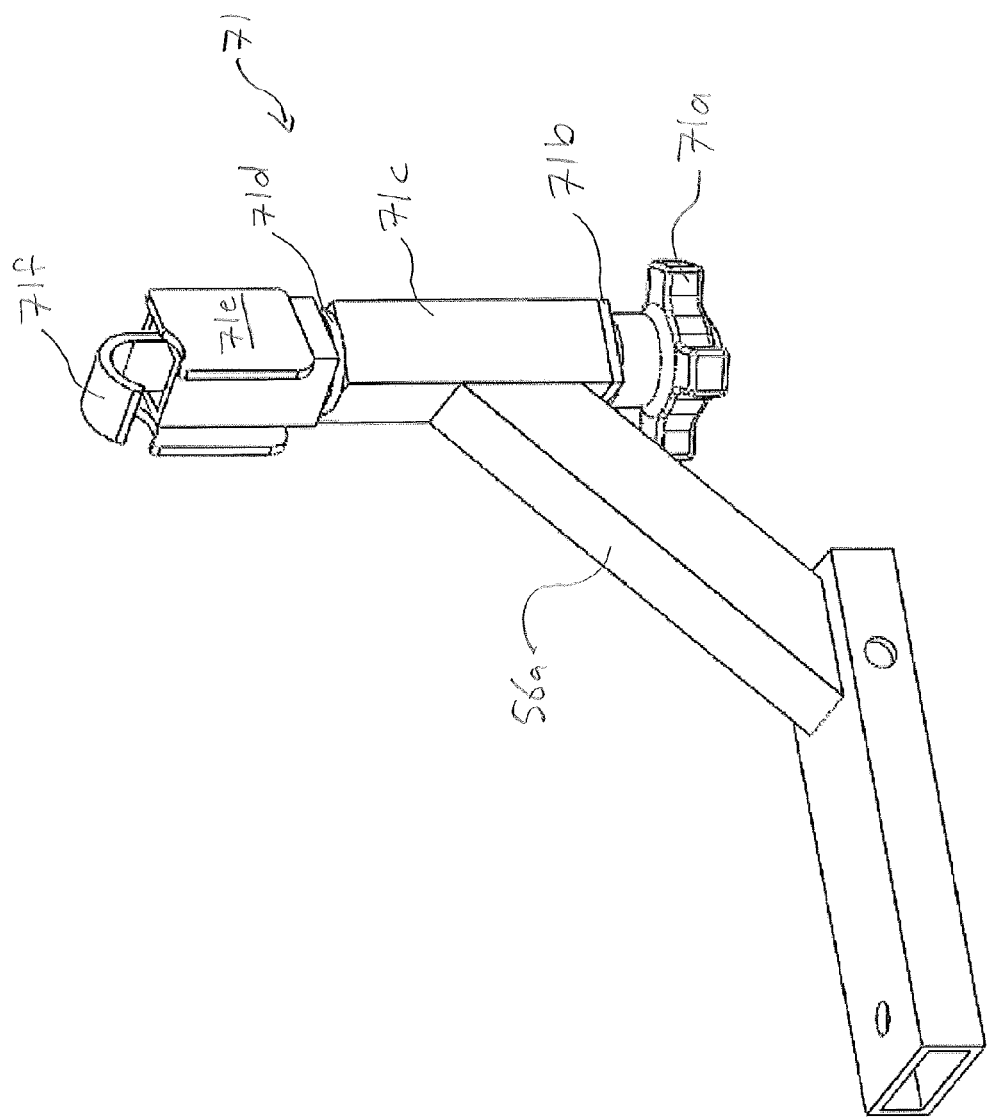

Clamp member 71 is configured for 360 degrees of rotation. Clamp seat 71e and hook 71f are designed to pivot on spacer 71d, such as illustrated in FIG. 15. When knob 71a is loose, then clamp seat 71e may be rotated as desired, and then knob 71a tightened to secured clamp seat 71e and hook 71f at the desired angle relative to clamp positioning member 56a.

Figure 16:
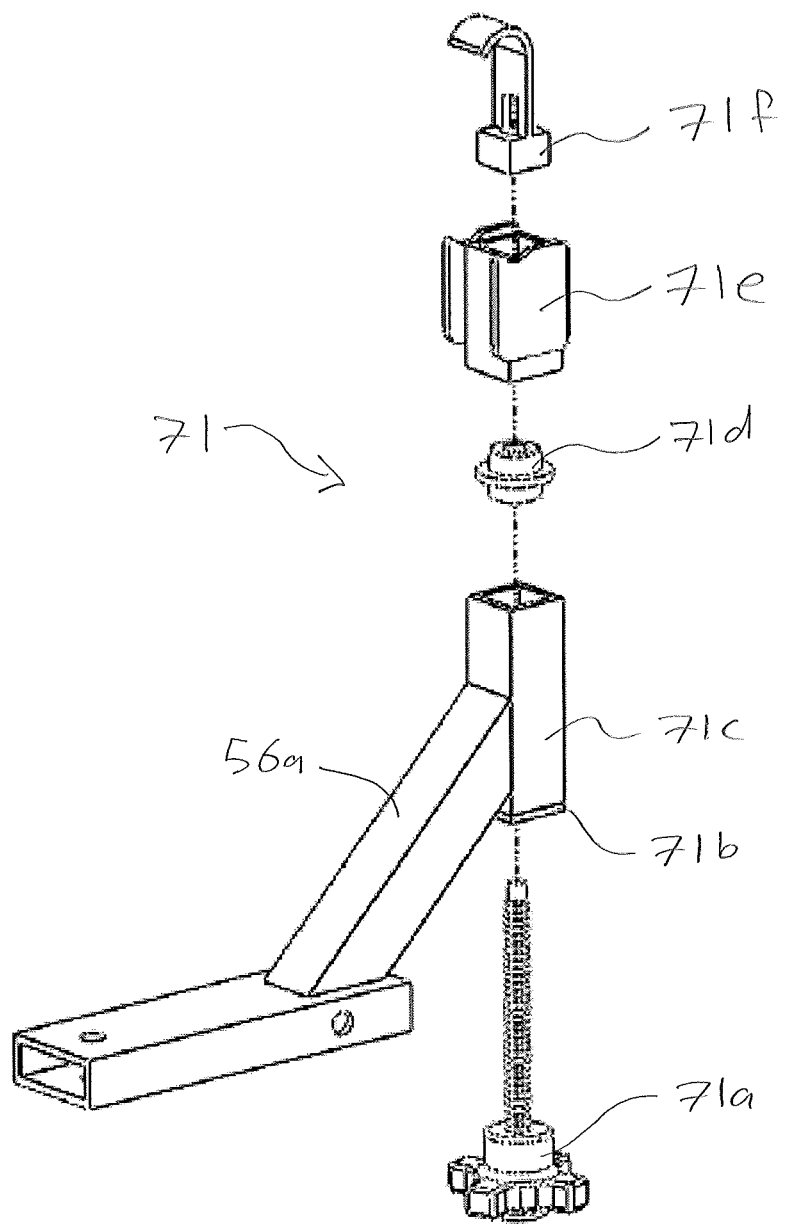

Hollow shank 71c is welded to clamp positioning member 56a. As illustrated in FIG. 16, knob 71a includes a threaded member designed to be received by hook 71f. Sleeve 71b is designed to receive knob 71a and is designed to rotationally support knob 71a. Spacer 71d is designed to allow the threaded member of knob 71a pass through it. Spacer 71d is also designed to separate clamp seat 713 from hollow shank 71c. Hook 71f is designed to mate with the inner surfaces of clamp seat 71e such that rotation of clamp seat 71e rotates hook 71f. Clamp seat 71e is also designed such that the pulling of hook 71f towards knob 71a via rotation of the threaded member of knob 71a results in clamp seat 71e being pulled towards knob 71a as well.

Figure 17B:
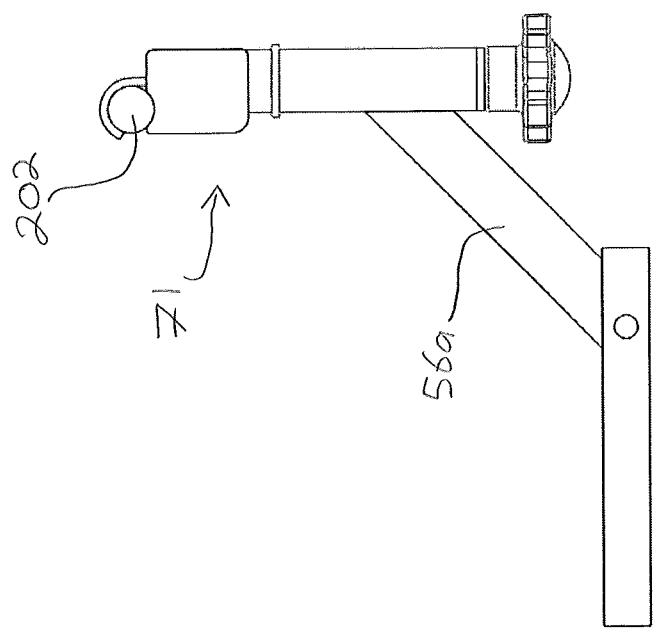
Figure 17A:
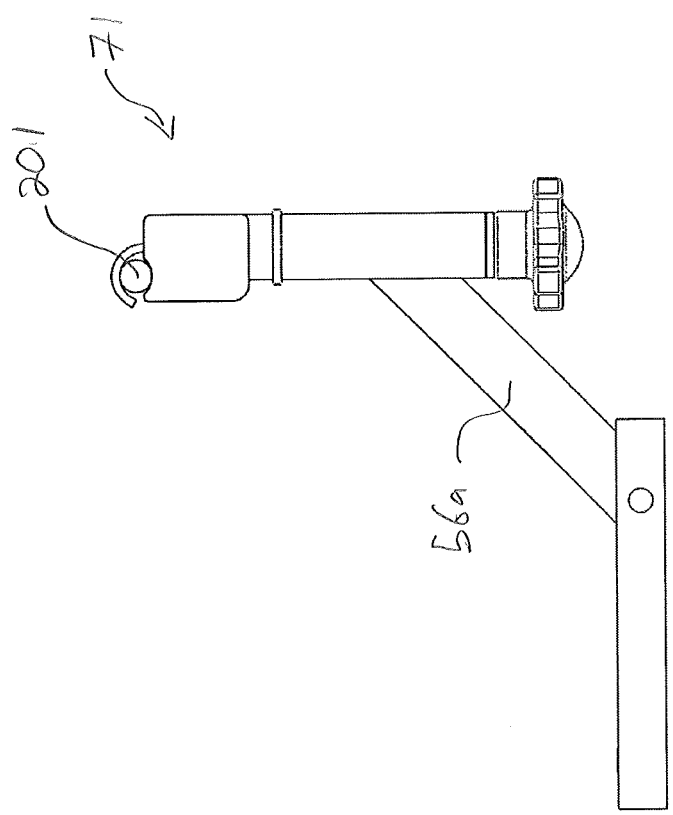

Clamp member 71 is designed to handle a variety of litter 200 frame shapes and the diameters of varying litter frame members. Commonly, litter 200 is constructed of metal rods between ½ inch to ¾ inch in diameter. FIG. 17A illustrates clamp member 71 clamped to a smaller diameter metal rod 201. FIG. 17B illustrates clamp member 71 clamped to a larger diameter metal rod 202.

Figure 18:
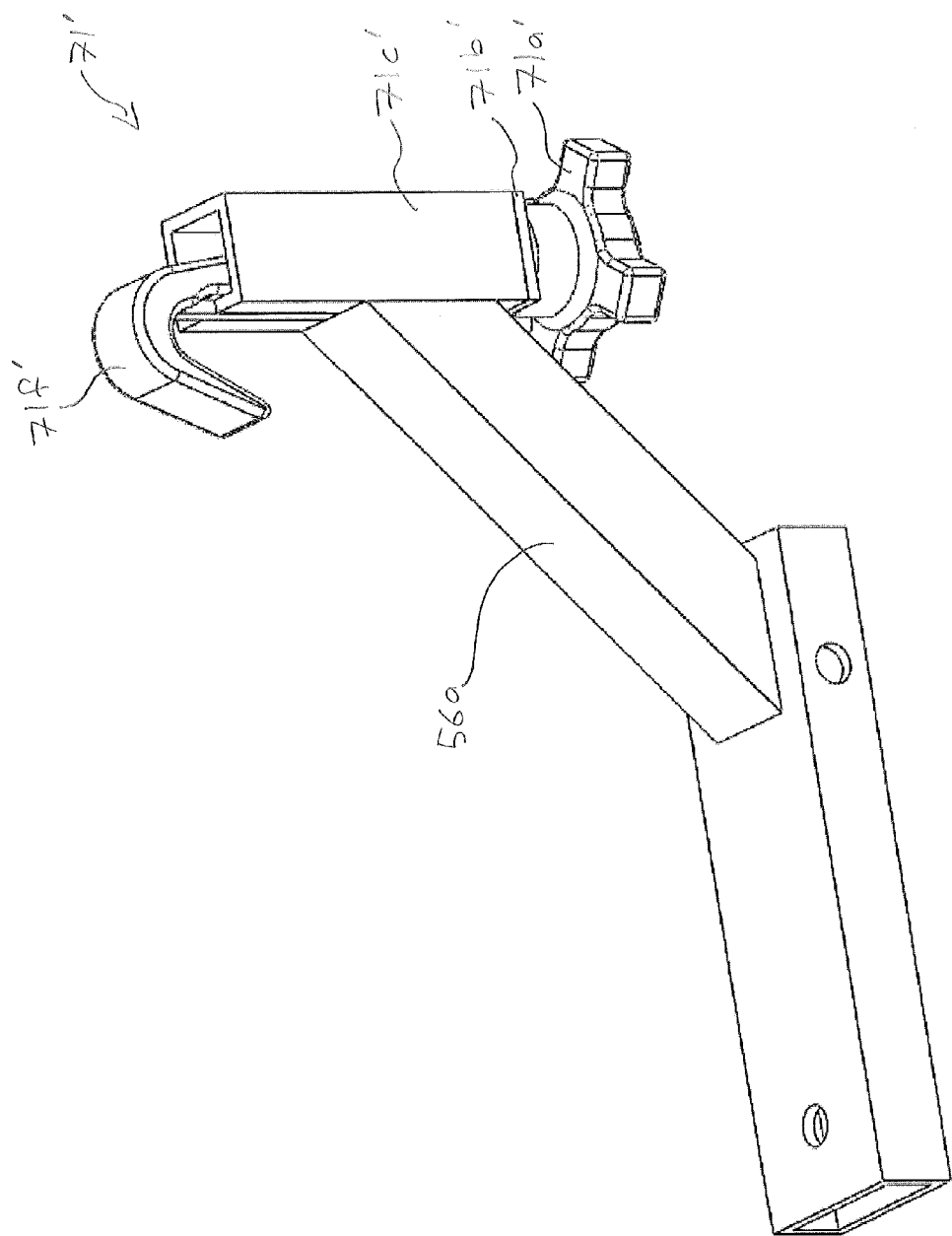
Figure 19:
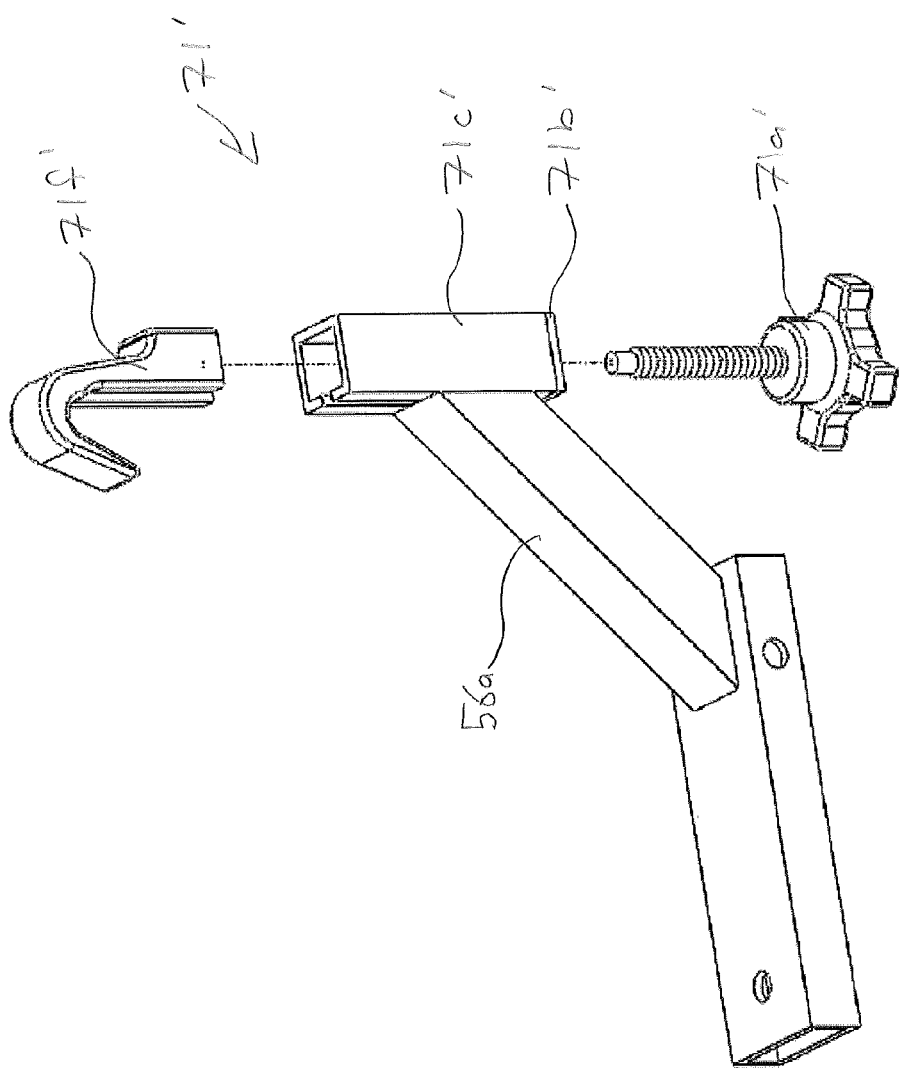

FIGS. 18 and 19 illustrate an alternate embodiment of a clamp member 70, clamp member 71'. Clamp member 71' comprises a hook 71f', knob 71a' that includes a threaded member designed to be received by hook 71f', sleeve 71b', and hollow shank 71c'. Knob 71a' and sleeve 71b' are similar to knob 71a and sleeve 71b, respectively. Hollow shank 71c' is welded to clamp positioning member 56a. The surface of hollow shank 71c' facing clamp positioning member 56a, in the portion of the surface above clamp positioning member 56a, includes a slot designed to allow hook 71f' to travel towards knob 71a' as knob 71a' is tightened. Hook 71f' is designed to travel up and down the inner surface of hollow shank 71c' as knob 71a' is tightened or loosened.

Figure 20:
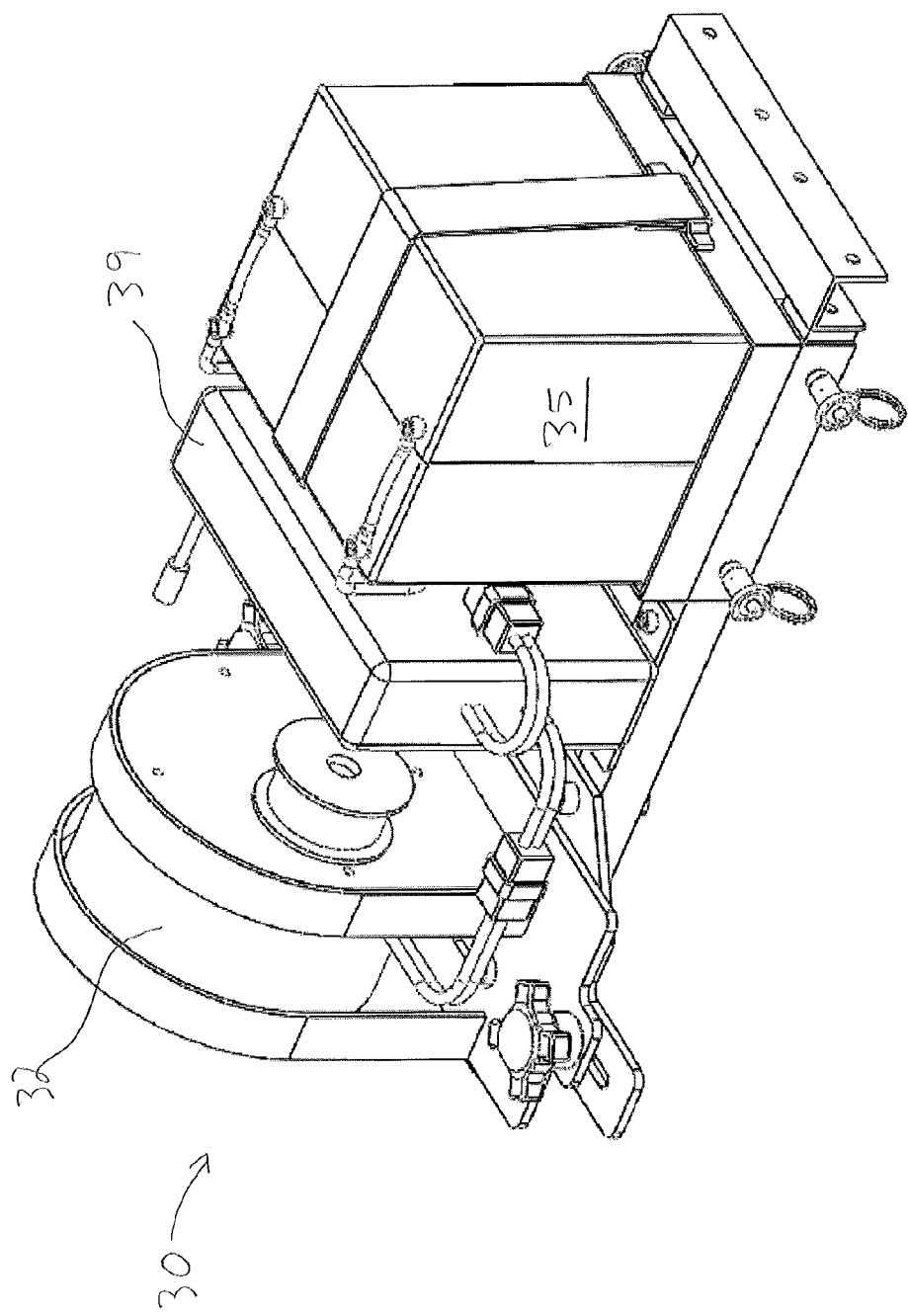
FIGS. 20 and 21 illustrate a further detailed embodiment of one embodiment of a motorized drive train that includes a controller.
Figure 21:
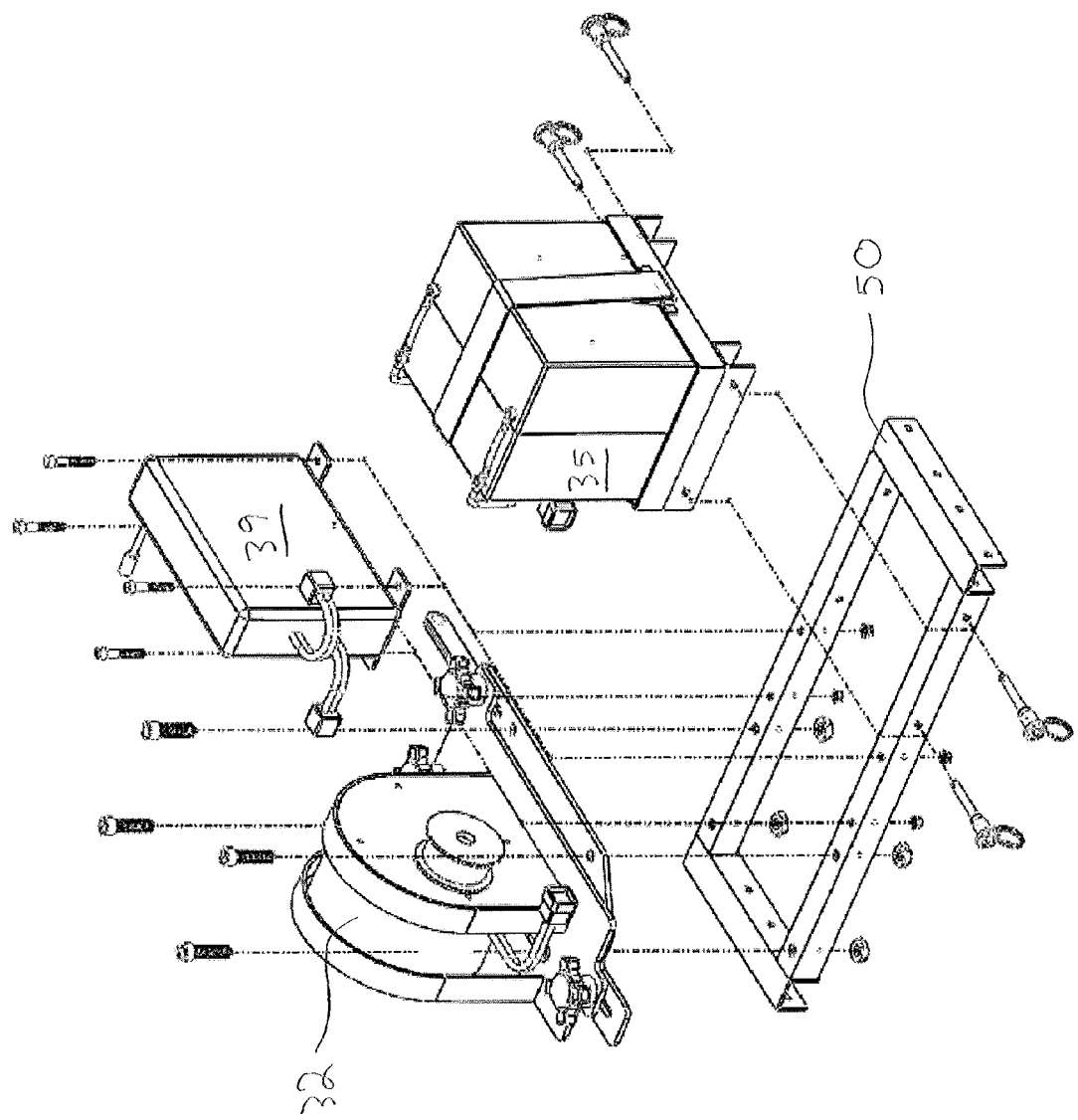

FIGS. 20 and 21 illustrate a further detailed embodiment of motorized drive train 30 that includes a controller 39. Controller 39 is designed to operably interact with throttle control member 38 (not shown in FIGS. 20 and 21), energy source 35, and motor 32. FIG. 21 illustrates attachment of controller 39, energy source 35, and motor 32 to component base member 50.

All of the components of kit 100 may be made of materials suitable for their use. Generally, it may be preferred to choose materials that are as light as possible, but with sufficient strength, elasticity, and toughness. For example, for many of frame members 40 aluminum may be an appropriate choice. However, for axle assembly 20 stainless steel or a titanium alloy may be a better choice. Additionally, polymer and composite materials, such as carbon fiber, may potentially be used with particular parts of kit 100.

It should be understood that FIGS. 1-21 illustrate specific embodiments of the invention. One of ordinary skill in the art would understand that numerous variations may be made to the embodiments disclosed in FIGS. 1-21 and described above.

For example, single wheel 10 may be an ATV-type tire, motorcycle or moped-type tire, or a mountain bike tire. Additionally, single wheel 10 may two mountain bike tires side-by-side. It should be understood that axle assembly 20 would have to be modified accordingly depending upon the particular single wheel 10 used. It should also be understood that various modifications to axle assembly 20, even for use with illustrated single wheel 10 are contemplated herein.

In another example of variations to the illustrated embodiments, motor 32 of motorized drive train 30 is illustrated as an electric motor and energy source 35 is illustrated as a battery pack. However, motor 32 may also be an internal-combustion engine or any other applicable drive known in the art. Likewise, energy source 35 may be fuel tank. Similarly, controller 39 may be a controller for an electric motor or engine, as needed. Any necessary hardware, software, wiring, and/or instrumentation required to operate motorized drive train 30 is readily known to those of ordinary skill in the art and is not discussed in detail herein. Similarly, motorized drive train 30 is illustrated as utilizing belt 36; however, belt 36 may be chain instead and the applicable sprockets modified accordingly. Additionally, belt 36 may not be present and instead single wheel 10 is driven hydrostatically.

In another example of variations to the illustrated embodiments, brake assembly 60 is essentially a mountain-bike type braking system. Numerous braking systems are known in the art and may be utilized with embodiments of the present invention.

In another example of variations to the illustrated embodiments, frame members 40 are illustrated as forming essentially a "V" shape. Frame members 40 may be shaped in any manner that will support single wheel 10 and motorized drive train 30 and also facilitate carrying a litter 200.

It should also be understood that bearing assembly 46 is just one embodiment of a bearing assembly that may be used in embodiments of the present invention. Other bearing systems known in the art may also be used. Likewise, clamp member 71 and clamp member 71' are only two embodiments of clamp members that may be used. Other clamps known in the art that could be used with a litter 200 are also encompassed within embodiments of the present invention.

Additionally, litter 200 may be any search and rescue litter known in the art.

All publications and patent applications mentioned in the specification are indicative of the level of those skilled in the art to which this invention pertains. All publications and patent applications are herein incorporated by reference to the same extent as if each individual publication or patent application was specifically and individually indicated to be incorporated by reference. The mere mentioning of the publications and patent applications does not necessarily constitute an admission that they are prior art to the instant application.

Although the foregoing invention has been described in some detail by way of illustration and example for purposes of clarity of understanding, it will be understood that certain changes and modifications may be practiced within the scope of the appended claims.

What is claimed is:

1. An assemblable and disassemblable motorized litter transport kit, said kit comprising:
    a single wheel;
    an axle assembly configured to be securely and detachably engaged with said single wheel;
    a motorized drive train configured to be able to drive said single wheel via said axle assembly;
    frame members configured to be able to support said single wheel and said motorized drive train, wherein said frame members comprise:
        a first frame arm member,
        a second frame arm member,
        a third frame arm member, and
        a fourth frame arm member; and
    clamp members configured to be operably connected to said frame members and configured to releasably secure a litter to said frame members;
    wherein a first end of each of said first and second frame arm members includes a first bearing assembly, wherein a first end of each of said third and fourth frame arm members includes a second bearing assembly, wherein said first and second bearing assemblies are configured to be rotatably, securely, and operably connected with an axle of said axle assembly.

2. The kit of claim 1, wherein said first and second frame arm members are configured to be rotatably engaged with a first end of said axle and said third and fourth frame arm members are configured to be rotatably engaged with a second end of said axle, and wherein each of the frame arm members are configured to rotate parallel to each other upon engagement with said axle.

3. The kit of claim 1, wherein said frame members comprise a first side brace member configured to be able to rigidly position said first frame arm member relative to said second frame arm member, said frame members further comprising a second side brace member configured to be able to rigidly position said third frame arm member relative to said fourth frame arm member.

4. The kit of claim 1, wherein said frame members comprise a first cross brace member configured to be able to rigidly and symmetrically align said first frame arm member with said third frame arm member on opposing sides of said single wheel.

5. The kit of claim 1, wherein said frame members further comprise a component base frame member configured to be able to support a motor of said motorized drive train.

6. The kit of claim 5, wherein said component base frame member is also configured to be able to rigidly and symmetrically align said second frame arm member with said fourth frame arm member on opposing sides of said single wheel.

7. The kit of claim 1, wherein said clamp members are configured for 360 degrees of rotation.

8. The kit of claim 1, wherein said axle assembly comprises an axle configured to be operably connected to said single wheel, wherein said axle is configured to extend through the radial center of said single wheel and is also configured to protrude on either side of said single wheel, wherein said axle assembly further comprises a wheel hub member configured to be securely and detachably attached to said axle and also configured to be securely and detachably attached to a rim of said single wheel.

9. The kit of claim 8, said kit further comprising a brake assembly configured to be operably connected with a brake mount of a first frame arm member and also configured to be operably connected with said axle.

10. A method of assembling the kit of claim 1, said method comprising:
    attaching a single wheel to an axle assembly configured to be securely and detachably engaged with said single wheel;
    assembling frame members configured to be able to support said single wheel and a motorized drive train;

mounting said motorized drive train to said frame members, wherein said motorized drive train is configured to be able to drive said single wheel via said axle assembly; and attaching clamp members configured to be operably connected to said frame members and configured to releasably secure a litter to said frame members.

11. The kit of claim 1, wherein said first bearing assembly comprises:

a first cylindrical hub attached to said first end of said first frame arm and a second cylindrical hub attached to said first end of said second frame arm, wherein the first cylindrical hub is oriented next to and inline with the second cylindrical hub;

a first bearing sleeve configured to slide within an inner surface of said first cylindrical hub and said second cylindrical hub, wherein the first bearing sleeve includes a shoulder that overlaps with a bottom surface of said first cylindrical hub and wherein the first bearing sleeve extends beyond the top surface of said second cylindrical hub and wherein the first bearing sleeve includes an annular groove in the outer surface of the first bearing sleeve proximate said top surface of said second cylindrical hub, wherein the annular groove is configured to receive a first spring clip;

said first spring clip;

wherein when said first spring clip is in place, said first cylindrical hub and second cylindrical hub are sandwiched between said first spring clip and the shoulder of said first bearing sleeve;

and wherein said second bearing assembly comprises:

a third cylindrical hub attached to said first end of said third frame arm and a fourth cylindrical hub attached to said first end of said fourth frame arm, wherein the third cylindrical hub is oriented next to and inline with the fourth cylindrical hub;

a second bearing sleeve configured to slide within an inner surface of said third cylindrical hub and said fourth cylindrical hub, wherein the second bearing sleeve includes a shoulder that overlaps with a bottom surface of said third cylindrical hub and wherein the second bearing sleeve extends beyond the top surface of said fourth cylindrical hub and wherein the second bearing sleeve includes an annular groove in the outer surface of the second bearing sleeve proximate said top surface of said fourth cylindrical hub, wherein the annular groove is configured to receive a second spring clip;

said second spring clip;

wherein when said second spring clip is in place, said third cylindrical hub and fourth cylindrical hub are sandwiched between said second spring clip and the shoulder of said second bearing sleeve.

12. The kit of claim 11, further comprising:

a first bearing and a second bearing, wherein the first bearing and the second bearing sit within an inner surface of said first bearing sleeve and wherein an inner surface of the first bearing and an inner surface of the second bearing is configured to engage said axle of said axle assembly and thereby allow parallel rotation of said first cylindrical hub relative to said second cylindrical hub relative to said axle; and a third bearing and a fourth bearing, wherein the third bearing and the fourth bearing sit within an inner surface of said second bearing sleeve and wherein an inner surface of the third bearing and an inner surface of the fourth bearing is configured to engage said axle of said axle assembly and thereby allow parallel rotation of said third cylindrical hub relative to said fourth cylindrical hub relative to said axle.

13. An assemblable and disassemblable motorized litter transport kit, said kit comprising:

a single wheel;

an axle assembly configured to be securely and detachably engaged with said single wheel;

a motorized drive train configured to be able to drive said single wheel via said axle assembly;

frame members configured to be able to support said single wheel and said motorized drive train, wherein said frame members comprise:

a first frame arm member, a second frame arm member, a third frame arm member, and a fourth frame arm member; and clamp members configured to be operably connected to said frame members and configured to releasably secure a litter to said frame members;

wherein said frame members comprise a first clamp mount assembly configured to be able to adjustably secure a first clamp member a selected distance from a second clamp member.

14. The kit of claim 13, wherein said first clamp mount assembly comprises a first cross support member, a first clamp positioning member mounted to said first clamp member and configured to be able to slidably engage a first end of said first cross support member, a second clamp positioning member mounted to said second clamp member and configured to be able to slidably engage a second end of said first cross support member, wherein said first clamp positioning member and said second clamp positioning member are each configured to be able to adjust said selected distance of said first clamp member from said second clamp member.

15. The kit of claim 14, wherein said first clamp mount assembly further comprises a first connecting member configured to be able to rigidly secure a second end of said first frame arm member to said first cross support and wherein said first clamp mount assembly further comprises a second connecting member configured to be able to rigidly secure a second end of said third frame arm member to said first cross support.

16. The kit of claim 13, wherein said frame members comprise a second clamp mount assembly configured to adjustably secure, upon assembly, a third clamp member a selected distance from a fourth clamp member.

17. An assemblable and disassemblable motorized litter transport kit, said kit comprising:

a single wheel;

an axle assembly configured to be securely and detachably engaged with said single wheel;

a motorized drive train configured to be able to drive said single wheel via said axle assembly;

frame members configured to be able to support said single wheel and said motorized drive train; and clamp members configured to be operably connected to said frame members and configured to releasably secure a litter to said frame members, wherein said clamp members each comprise a hook;

a knob comprising a threaded member designed to be received by said hook; a hollow shank with a first end and a second end;

a sleeve configured to sit within said second end of said hollow shank, configured to receive said knob, and further configured to rotationally support said knob;

a spacer configured to allow said threaded member of said knob to pass through the radial center of said spacer and wherein said spacer is configured to separate a clamp seat from said first end of said hollow shank;

said hook is configured to mate with the inner surfaces of said clamp seat such that rotation of said clamp seat rotates said hook;

said clamp seat is configured such that the pulling of said hook towards said knob via rotation of said threaded member of said knob results in said clamp seat being pulled with said hook.

18. The kit of claim 17, wherein said hook and said clamp seat are configured to clamp rod-shaped elements of said litter.

* * * * *